United States Patent
Zhu et al.

(10) Patent No.: US 11,644,317 B2
(45) Date of Patent: *May 9, 2023

(54) RADIO ENHANCED AUGMENTED REALITY AND VIRTUAL REALITY WITH TRULY WIRELESS EARBUDS

(71) Applicant: Google LLC, Mountain View, CA (US)

(72) Inventors: Jiang Zhu, Cupertino, CA (US); Chi Kin Benjamin Leung, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/375,587

(22) Filed: Jul. 14, 2021

(65) Prior Publication Data
US 2021/0341292 A1    Nov. 4, 2021

Related U.S. Application Data

(63) Continuation of application No. 16/386,867, filed on Apr. 17, 2019, now Pat. No. 11,105,636.

(51) Int. Cl.
*G01C 21/20* (2006.01)
*H04B 17/318* (2015.01)
*G01S 5/02* (2010.01)

(52) U.S. Cl.
CPC .......... *G01C 21/206* (2013.01); *G01S 5/0268* (2013.01); *G01S 5/0273* (2013.01); *G01S 5/0294* (2013.01); *H04B 17/318* (2015.01)

(58) Field of Classification Search
CPC ... G01C 21/206; G01S 5/0268; G01S 5/0273; G01S 5/0294; H04B 17/318; H04W 4/026; H04W 4/33; H04W 4/029; H04W 4/024

See application file for complete search history.

(56) References Cited

U.S. PATENT DOCUMENTS

| | | |
|---|---|---|
| 8,577,053 B1 | 11/2013 | Simon |
| 8,588,432 B1 | 11/2013 | Simon |
| 11,105,636 B2 | 8/2021 | Zhu et al. |
| 2010/0309045 A1 | 12/2010 | Laine |
| 2015/0104152 A1 | 4/2015 | Reinhardt et al. |
| 2015/0348146 A1 | 12/2015 | Shanmugam et al. |
| 2018/0024362 A1 | 1/2018 | Williamson |

(Continued)

FOREIGN PATENT DOCUMENTS

WO    2014177909 A1    11/2014

OTHER PUBLICATIONS

"Notice of Allowance", U.S. Appl. No. 16/386,867, filed May 5, 2021, 5 pages.

(Continued)

*Primary Examiner* — Russell Frejd
(74) *Attorney, Agent, or Firm* — Colby Nipper PLLC

(57) ABSTRACT

The technology provides for a pair of earbuds. For instance, a first earbud may include a first antenna, and a second earbud may include a second antenna. The pair of earbuds may further include one or more processors configured to receive, from the first antenna, a first signal from a beacon, and receive, from the second antenna, a second signal from the beacon. Based on the first signal and the second signal, the one or more processors may determine at least one signal strength. The one or more processors may determine a position of the user relative to the beacon based on the at least one signal strength.

18 Claims, 17 Drawing Sheets

(56) References Cited

U.S. PATENT DOCUMENTS

2020/0292817 A1  9/2020  Jones et al.
2020/0294472 A1  9/2020  Jones et al.
2020/0333141 A1  10/2020 Zhu et al.

OTHER PUBLICATIONS

International Preliminary Report on Patentability for International Application No. PCT/US2019/058780 dated Oct. 28, 2021. 14 pages.
Wielandt, Stijn, and Lieven De Strycker. "Indoor Multipath Assisted Angle of Arrival Localization." Sensors (Basel, Switzerland) vol. 17,11 2522. Nov. 2, 2017, doi:10.3390/s17112522. pp. 1-29. Retrieved from the Internet: <https://www.ncbi.nlm.nih.gov/pmc/articles/PMC5713621/>.
Invitation to Pay Additional Fees for International Application No. PCT/US2019/058780 dated Jan. 31, 2020. 17 pages.
International Search Report and Written Opinion for International Application No. PCT/US2019/058780 dated Mar. 23, 2020. 21 pages.

600A

600B

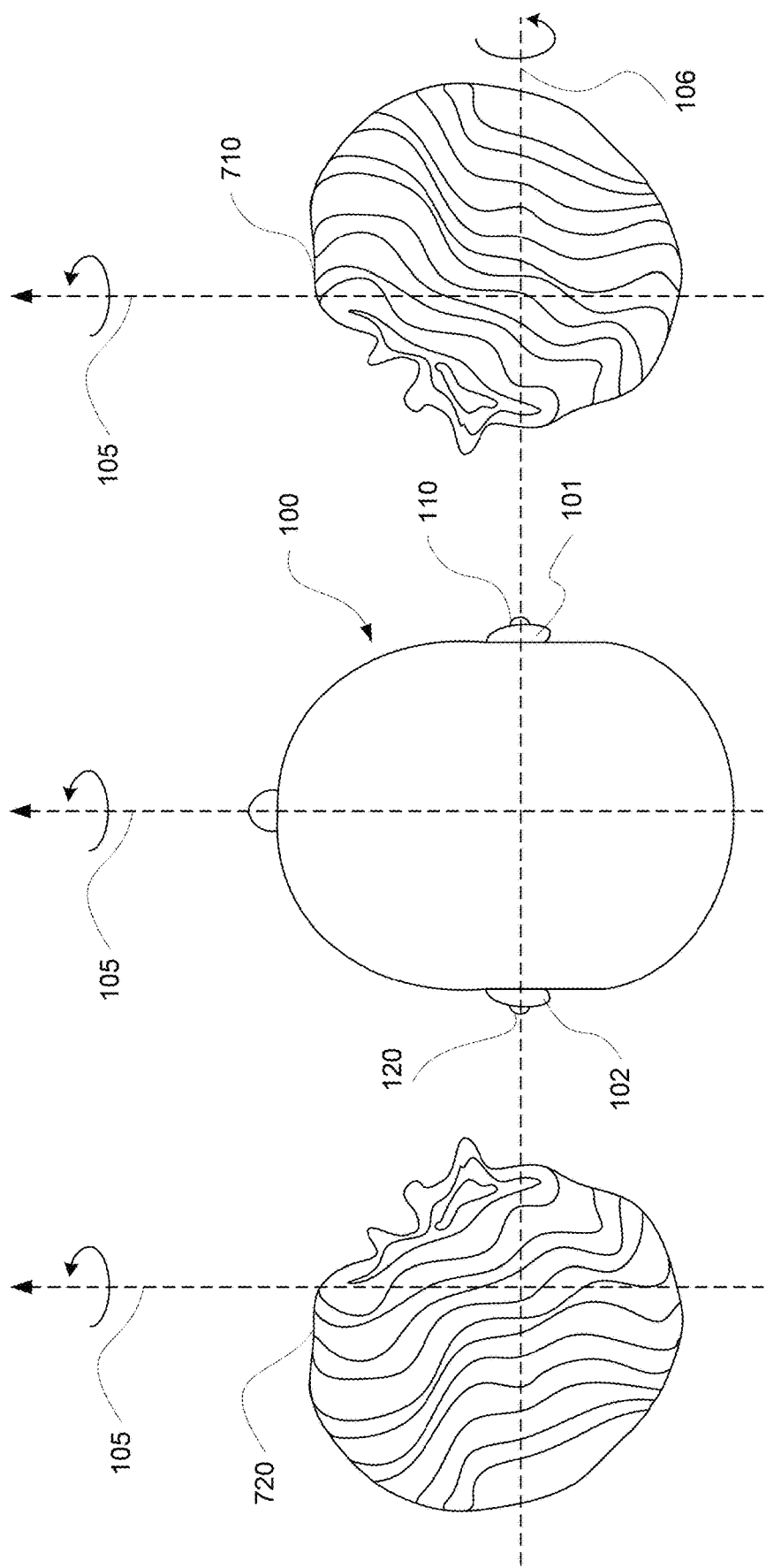

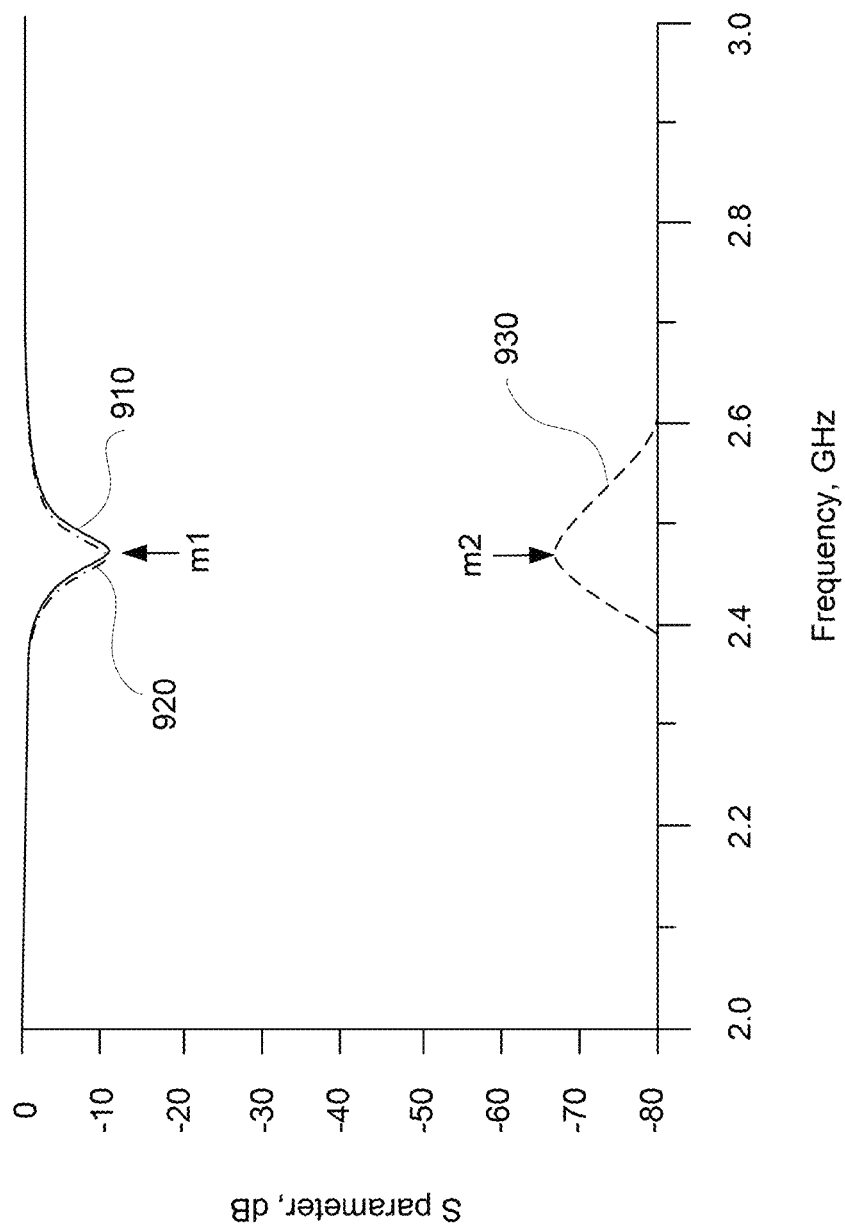

RADIO ENHANCED AUGMENTED REALITY AND VIRTUAL REALITY WITH TRULY WIRELESS EARBUDS

CROSS-REFERENCE TO RELATED APPLICATIONS

The present application is a continuation of U.S. Pat. No. 11,105,636, filed Apr. 17, 2019, the disclosure of which is incorporated herein by reference.

BACKGROUND

Positioning and navigational systems often rely on satellites, such as the Global Positioning System (GPS). However, positioning and navigation using satellite signals may be difficult in an indoor environment, since the satellite signals may not be able to penetrate the walls forming or within the indoor environment. Systems for providing positioning and navigational information in an indoor environment may include beacons that emit signals, such as radio frequency (RF) signals. These beacons may be installed at fixed locations in the indoor environment. However, such indoor positioning and navigational systems may also face challenges, since the many walls and floors in an indoor environment may have multi-path effects that degrade signal quality. Further, indoor environments may also be crowded environments with many people and objects, which may further impact signal quality.

Wireless earbuds are configured for wireless communication with other devices. In this regard, the wireless earbuds may include one or more antennas for connecting to another device and transmitting and/or receiving signals to and from the device. For example, wireless earbuds may be paired via Bluetooth® with another user device, such as a phone or a computer. The wireless earbuds may receive audio data from the paired phone or computer, and generate audio output to a user.

BRIEF SUMMARY

The present disclosure provides for receiving, by one or more processors from a first antenna located in a first earbud worn by a user, a first signal from a beacon; receiving, by the one or more processors from a second antenna located in a second earbud worn by the user, a second signal from the beacon; determining, by the one or more processors based on the first signal and the second signal, at least one signal strength; and determining, by the one or more processors based on the at least one signal strength, a position of the user relative to the beacon.

The first signal and the second signal may be received using a same frequency channel.

The method may further comprise controlling, by the one or more processors, one or more antenna control circuits to combine the first signal and the second signal, wherein the at least one signal strength is determined based on the combined signal.

The method may further comprise determining, by the one or more processors, that a quality of the first signal is stronger than a quality of the second signal, wherein the signal strength is determined based on the first signal.

The method may further comprise receiving, by the one or more processors, motion data from one or more sensors indicating a movement of the user; correlating, by the one or more processors, the motion data with the first signal and the second signal, wherein determining the position of the user relative to the beacon is further based on the correlated motion data.

The method may further comprise receiving, by the one or more processors from the first antenna, a third signal from a second beacon; receiving, by the one or more processors from the second antenna, a fourth signal from the second beacon; determining, by the one or more processors based on the third signal and the fourth signal, at least one other signal strength; and determining, by the one or more processors based on the at least one other signal strength, a position of the user relative to the second beacon.

The method may further comprise receiving, by the one or more processors, a request for navigation instructions for reaching a destination; accessing, by the one or more processors, a storage system to obtain a location of the destination relative to the beacon; generating, by the one or more processors based on the position of the user relative to the beacon and the location of the destination relative to the beacon, navigation instructions for reaching the destination. The beacon and the destination may be in an indoor environment.

The method may further comprise comparing, by the one or more processors, the first signal and the second signal; determining, by the one or more processors based on the comparison, a facing direction of the user with respect to the beacon, wherein the navigation instructions are generated further based on the facing direction of the user.

The method may further comprise receiving, by the one or more processors from the first antenna, a third signal from the beacon; receiving, by the one or more processors from the second antenna, a fourth signal from the beacon; determining, by the one or more processors based on the third signal and the fourth signal, at least one new signal strength; determining, by the one or more processors based on the at least one new signal strength, a new position of the user relative to the beacon; and generating, by the one or more processors based on the new position of the user to relative the beacon, updated navigation instructions for reaching the destination.

The method may further comprise receiving, by one or more processors from the first antenna, a third signal from the beacon; receiving, by the one or more processors from the second antenna, a fourth signal from the beacon; comparing, by the one or more processors, the third signal and the fourth signal; determining, by the one or more processors based on the comparison, a new facing direction of the user with respect to the beacon; and generating, by the one or more processors based on the new facing direction of the user's with respect to the beacon, updated navigation instructions for reaching the destination.

The method may further comprise receiving, by the one or more processors, a request for additional information about items in an indoor environment; accessing, by the one or more processors, a storage system to obtain locations of a plurality of items relative to the beacon in the indoor environment; determining, by the one or more processors based on the position of the user relative to the beacon and the locations of the plurality of items relative to the beacon, a position of the user relative to an item of the plurality of items; determining, by the one or more processors based on the position of the user relative to the item, that the user is viewing the item; accessing, by the one or more processors, the storage system to obtain additional information about the item; and generating, by the one or more processors, an output including the additional information about the item.

The method may further comprise comparing, by the one or more processors, the first signal and the second signal, determining, by the one or more processors based on the comparison, a facing direction of the user with respect to the beacon; determining, by the one or more processors based on the position of the user relative to the item and the facing direction of the user with respect to the beacon, a facing direction of the user with respect to the item, wherein determining that the user is viewing the item is further based on the facing direction of the user with respect to the item. The method may further comprise receiving, by the one or more processors, motion data from one or more sensors indicating a movement of the user, wherein determining that the user is viewing the item is further based on the motion data.

The method may further comprise receiving, by the one or more processors, a request for enhanced interactive experience; accessing, by the one or more processors, a storage system to obtain a location of a display relative to the beacon; determining, by the one or more processors based on the position of the user relative to the beacon and the location of the display relative to the beacon, a position of the user relative to the display; controlling, by the one or more processors based on the position of the user relative to the display, one or more characteristics of an audio output.

The method further comprise comparing, by the one or more processors, the first signal and the second signal, determining, by the one or more processors based on the comparison, a facing direction of the user with respect to the beacon; determining, by the one or more processors based on the position of the user relative to the display and the facing direction of the user with respect to the beacon, a facing direction of the user with respect to the display, wherein controlling the one or more characteristics of the audio output is further based on the facing direction of the user with respect to the display. The method further comprise receiving, by the one or more processors, motion data from one or more sensors indicating a movement of the user, wherein controlling the one or more characteristics of the audio output is further based on the motion data.

The present disclosure further provides for a system comprising one or more processors configured to: receive, from a first antenna located in a first earbud worn by a user, a first signal from a beacon; receive, from a second antenna located in a second earbud worn by the user, a second signal from the beacon; determine, based on the first signal and the second signal, at least one signal strength; and determine, based on the at least one signal strength, a position of the user relative to the beacon. The system may further comprise one or more output devices configured to generate outputs with one or more characteristics based on the position of the user relative to the beacon.

The present disclosure still further provides for a pair of earbuds comprising a first earbud including a first antenna; a second earbud including a second antenna; and one or more processors configured to: receive, from the first antenna, a first signal from a beacon; receive, from the second antenna, a second signal from the beacon; determine, based on the first signal and the second signal, at least one signal strength; and determine, based on the at least one signal strength, a position of a user relative to the beacon.

BRIEF DESCRIPTION OF THE DRAWINGS

FIGS. 7A and 7B illustrate example radiation patterns for two antennas in the pair of wireless earbuds shown in FIGS. 1A-B in accordance with aspects of the disclosure.

FIG. 9 is an example graph showing example coupling effects between the two antennas of the pair of wireless earbuds shown in FIGS. 1A-B in accordance with aspects of the disclosure.

DETAILED DESCRIPTION

Overview

Figure 1A:
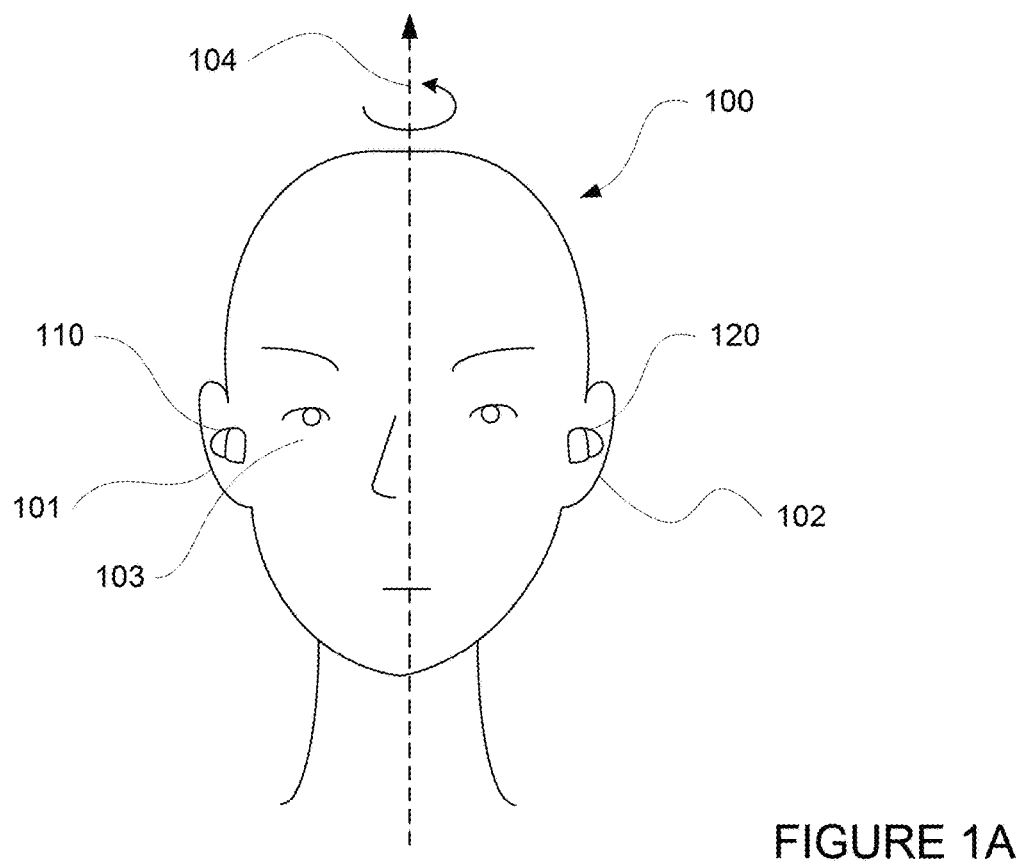
FIGS. 1A and 1B are pictorial diagrams illustrating an example pair of wireless earbuds in accordance with aspects of the disclosure.

The technology generally relates to using wireless earbuds to determine positions. As mentioned above, positioning systems relying on satellite signals may perform poorly in an indoor environment. Positioning systems using radio frequency signals may also perform poorly in an indoor environment, for example due to multi-path effects and shadowing effects (described herein) that may degrade signal quality. Multiple antennas may mitigate the negative impacts of these degrading effects by transmitting and/or receiving signals in diversity and Multiple-Input-Multiple-Output (MIMO) schemes. However, due to the small form factors (SFF) of many user devices, it may not be possible to configure the antennas to provide sufficient spatial and/or radiation pattern diversity to effectively mitigate the degrading effects. In addition, coupling between the multiple antennas in the same device and shadowing from a user's body may further limit the performance of using multiple antennas in the same device.

To address these issues, the present disclosure provides a system configured to use antennas housed in two wireless earbuds for determining a position of a user. In this regard, the system may include a pair of wireless earbuds, with each earbud including an antenna. For example, the first earbud may include a first antenna and the second earbud may include a second antenna. The first antenna and the second antenna may both be configured to receive and/or transmit signals from the same frequency channel. For example, the frequency channel may have a frequency range for Bluetooth® signals. The pair of wireless earbuds may be truly wireless such that the first earbud and the second earbud may communicate with other devices, as well as with each other, without requiring a wired connection.

The system may include one or more processors configured to determine a position of a user wearing the pair of wireless earbuds. In this regard, the one or more processors may receive from the first antenna a first signal received from the beacon, and from the second antenna a second signal received from the beacon. Based on the first signal and the second signal, the one or more processors may determine at least one signal strength. The one or more processors may then determine a position of the user relative to the beacon based on the signal strength. The beacon may be one of many beacons installed in an indoor environment, such as in or on walls, floors, and/or ceilings which make up the indoor environment. The indoor environment may be a shopping mall, an airport, a boarding gate, a store, a restaurant, an office building, and/or any other indoor locations.

In order to mitigate shadowing and/or multi-path effects that may impact accuracy in position determinations, the system may be configured to use diversity and/or MIMO schemes when determining the at least one signal strength. Such schemes may significantly improve signal quality since the first antenna and the second antenna are incased in separate housings, and thus signals received by the first antenna and second antenna may have low coupling levels (or high isolation levels). Further, when the earbuds are worn by a user, the first antenna and the second antenna are separated by the user's head, as such, the first antenna and second antenna may have directivity and/or isolation levels greater than two antennas housed in a single device. Additionally or alternatively, other approaches, such as Time-of-Flight (ToF) and Angle-of-Arrival (AoA), may be used for position determinations.

In some instances, the one or more processors may further determine a facing direction of the user with respect to the beacon. For instance, since the first earbud and the second earbud are located at fixed positions with respect to the user's face when being worn, the one or more processors may compare the first signal with the second signal. Based on the comparison, the one or more processors may determine a facing direction of the user with respect to the beacon. Additionally or alternatively, other approaches, such as Time-of-Flight (ToF) and Angle-of-Arrival (AoA), may be used for determining the facing direction of the user.

In other instances, the one or more processors may determine the position and/or facing direction of the user further based on motion data. For instance, the one or more processors may receive motion data from one or more sensors. For example, the motion data may include acceleration measurements from one or more accelerometers, orientation measurements from one or more gyroscopes, etc. The one or more processors may correlate the motion data with the first signal and the second signal, for example by matching respective timestamps, and determine the position and/or facing direction of the user further based on the motion data.

The system may use the position and/or facing direction determinations to provide interactive experience to the user wearing the wireless earbuds. In one aspect, the one or more processors of the system may receive a request for navigational guidance for reaching a destination in an indoor environment. The destination may be one of many points of interest in the indoor environment. The one or more processors may access a storage system to obtain a location of the destination relative to the beacon. Based on the position of the user to the beacon and the location of the destination relative to the beacon, the one or more processors may determine a position of the user relative to the destination. The one more processors may then generate and provide navigation instructions for reaching the destination based on the position of the user relative to the destination. For example, the navigation instructions may be outputted to the user by one or more speakers of the wireless earbuds.

In another aspect, the one or more processors of the system may receive from the user a request for additional information about items in an indoor environment. For example, the indoor environment may be a museum or a gallery with various items on exhibit. The one or more processors may access a storage system to obtain locations of a plurality of items relative to the beacon. Based on the position of the user relative to the beacon and the locations of the plurality of items relative to the beacon, the one or more processors may determine that the user is viewing an item of the plurality of items. The one or more processors may obtain additional information about the item from a storage system, and then generate the additional information about the item to be outputted to the user.

In yet another aspect, the one or more processors of the system may receive from the user a request for enhanced interactive experience, such as augmented or virtual reality. For example, the user may be viewing a video or playing a video game on another user device that includes a display. The one or more processors may access a storage system to obtain a location of the display relative to the beacon. Based on the position of the user relative to the beacon and the location of the display relative to the beacon, the one or more processors may determine a position of the user relative to the display. Based on the position of the user relative to the display, the one or more processors may control one or more characteristics of an audio output to the user. For example, volume of an audio output may be adjusted to be louder in the first earbud than the second earbud, based on a facing direction of the user.

The technology is advantageous because it provides improved accuracy in position determinations for navigation in an indoor environment. By using signals from two antennas housed in two wireless earbuds, which are further insulated by a user's head, effects that degrade signal quality may be significantly mitigated. Moreover, radiation patterns from two antennas housed in separate earbud housings exhibit higher directivity, isolation, radiation pattern diversity, and spatial diversity than two antennas housed inside the same device. With improved signal quality and thus sensitivity to changes in position and/or facing direction of a user wearing the wireless earbuds, the two antennas may be used to provide interactive experience to a user. For instance, the user may obtain step-by-step navigation instructions simply by making slight head movements, instead of attempting to point a mobile phone in a particular direction. For another instance, the user may automatically obtain relevant information on an item the user is viewing, without having to provide user inputs such as by clicking on buttons on a traditional audio guide. For still another instance, characteristics of an audio output for the user may be adjusted based on the user's head movements, thereby improving the user's experience.

Example Systems

Figure 1B:
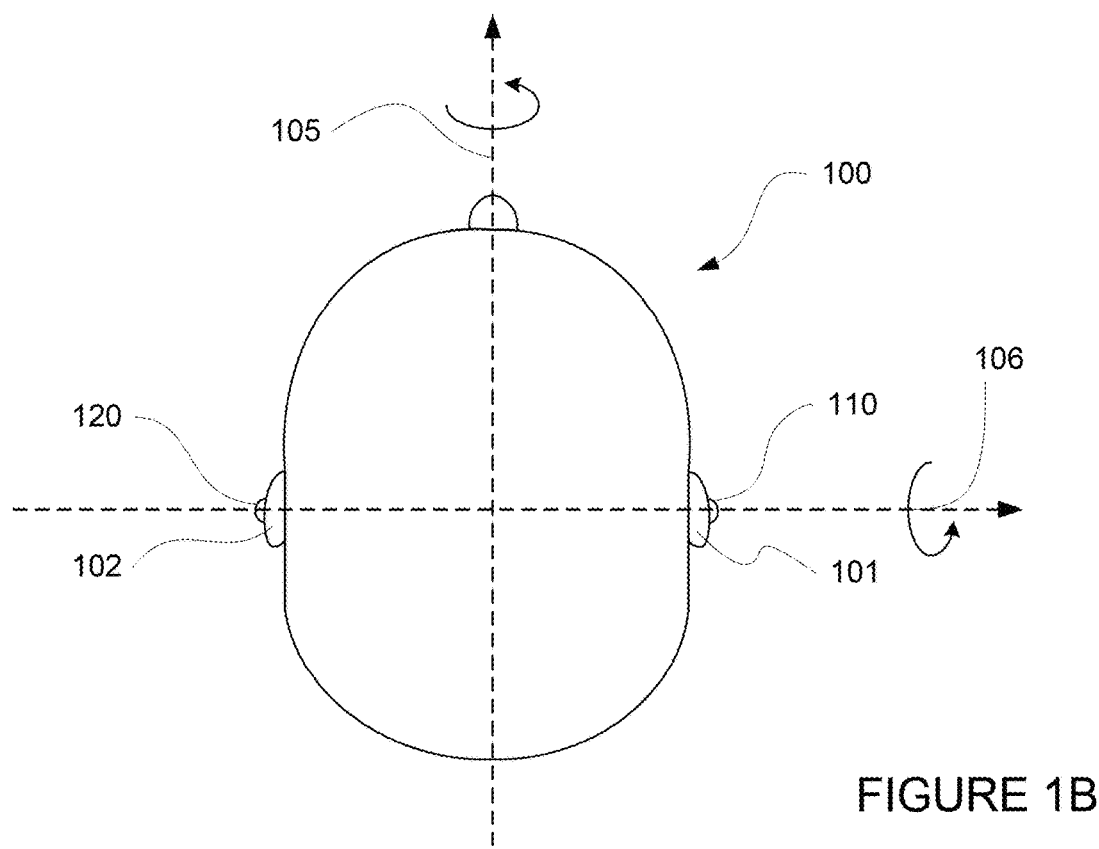

FIGS. 1A and 1B illustrate a user 100 wearing a pair of wireless earbuds including a first earbud 110 and a second earbud 120. FIG. 1A shows a front view of the user 100 and FIG. 1B shows a top view of the user 100. For example as shown, the first earbud 110 may be configured to be worn in a right ear 101 of the user 100, and the second earbud 120 may be configured to be worn in a left ear 102 of the user 100. The wireless earbuds 110, 120 may be wireless in that they do not require a wired connection for use. For instance, the earbuds may receive signals wirelessly such as from a music player, phone, or other device to perform a number of functions, such as to generate output, to communicate with each other and/or other devices, to be charged, etc. The wireless earbuds 110, 120 may be truly wireless, in that they also do not require a wired connection in order to communicate with each other. The wireless earbuds 110, 120 may be configured to have physical features, such as ear tips, that allow the wireless earbuds 110, 120 to securely and comfortably fit in the ears 101, 102 respectively.

As further shown in FIGS. 1A and 1B, while being worn by the user 100, the first earbud 110 and the second earbud 120 are configured to have fixed positions with respect to the user's ears 101 and 102, as well as with respect to the user's eyes 103. For instance, and as shown in FIG. 1A, the positions of the wireless earbuds 110, 120 can be defined with respect to a vertical axis 104 through the head of the user 100. As shown in FIG. 1B, the positions of the wireless earbuds 110, 120 can also be defined with respect to a first horizontal axis 105 and a second horizontal axis 106 through the head of the user 100. In some instances, the vertical axis 104, and the first and second horizontal axes 105 and 106 may intersect at a point.

Figure 2:
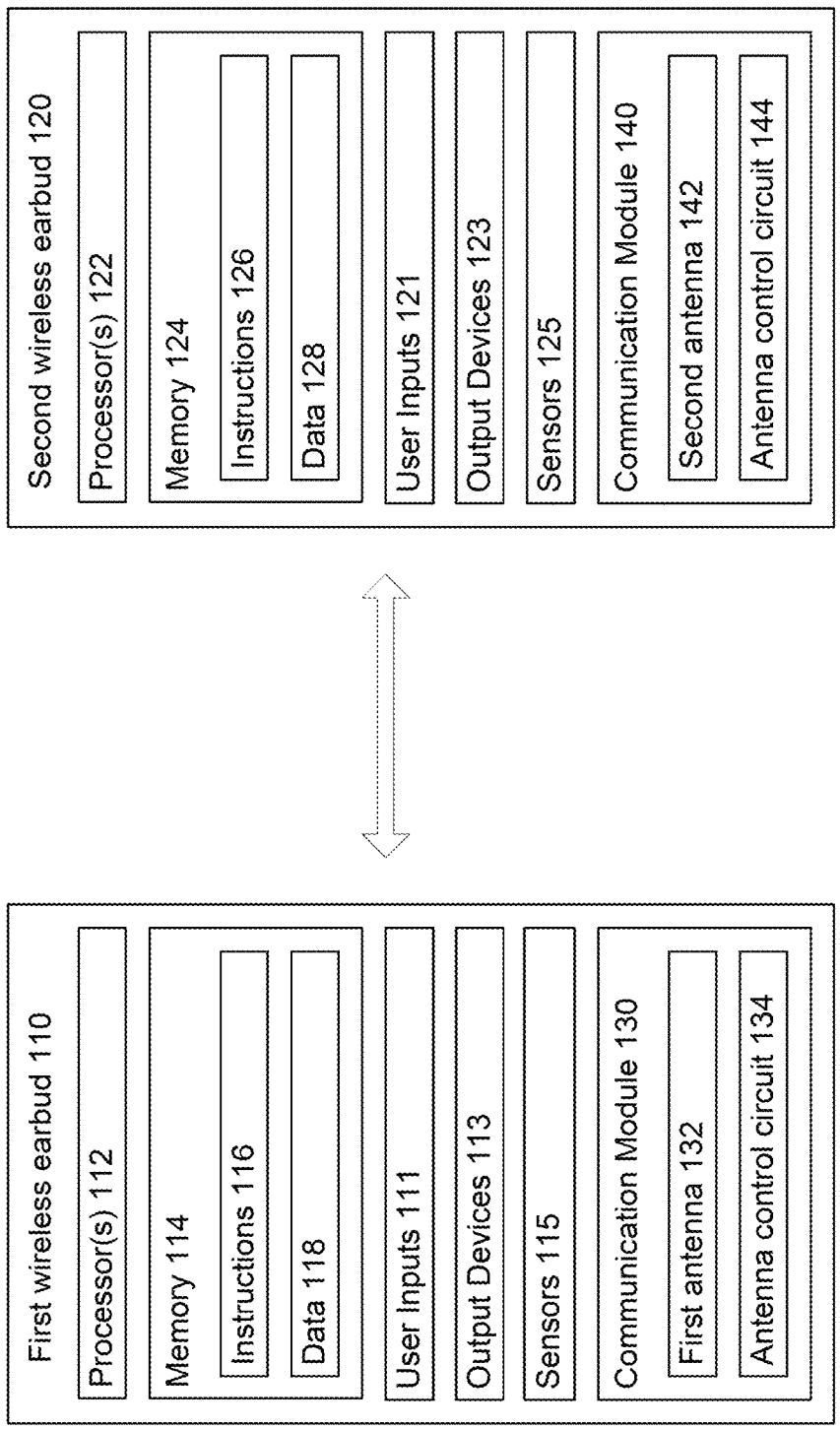
FIG. 2 is a block diagram of the example pair of wireless earbuds of FIGS. 1A-B in accordance with aspects of the disclosure.

FIG. 2 is a functional block diagram of the pair of wireless earbuds 110, 120 in which the features described herein may be implemented. It should not be considered as limiting the scope of the disclosure or usefulness of the features described herein. For example as shown, the first earbud 110 may contain one or more processors 112, memory 114 and other components typically present in general purpose computing devices, and the second earbud 120 may similarly contain one or more processors 122, memory 124 and other components typically present in general purpose computing devices.

Memories 114, 124 can store information accessible by the one or more processors 112, 122, including instructions 116, 126, that can be executed by the one or more processors 112, 122. Memories 114, 124 can also include data 118, 128 that can be retrieved, manipulated or stored by the processors 112, 122. The memories can be of any non-transitory type capable of storing information accessible by the processor, such as a hard-drive, memory card, ROM, RAM, DVD, CD-ROM, write-capable, and read-only memories.

The instructions 116, 126 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 118, 128 can be retrieved, stored or modified by the one or more processors 112, 122 in accordance with the instructions 116, 126. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112, 122 can be any conventional processors, such as a commercially available CPU. Alternatively, the processors can be dedicated components such as an application specific integrated circuit ("ASIC") or other hardware-based processor. Although not necessary, the wireless earbuds 110, 120 may include specialized hardware components to perform specific computing processes, such as decoding video, matching video frames with images, distorting videos, encoding distorted videos, etc. faster or more efficiently.

Although FIG. 2 functionally illustrates the processor, memory, and other elements of wireless earbuds 110, 120 as being within the same block, the processor, computer, computing device, or memory can actually comprise multiple processors, computers, computing devices, or memories that may or may not be stored within the same physical housing. For example, the memory can be a hard drive or other storage media located in housings different from that of the wireless earbuds 110, 120. Accordingly, references to a processor, computer, computing device, or memory will be understood to include references to a collection of processors, computers, computing devices, or memories that may or may not operate in parallel.

Further as shown in FIG. 2, wireless earbuds 110, 120 may include one or more user inputs, such as user inputs 111, 121 respectively. For instance, user inputs may include mechanical actuators, soft actuators, periphery devices, sensors, and/or other components. For example, users may be able to control various audio characteristics using the user inputs 111, 121, such as turning audio on and off, adjusting volume, etc.

Wireless earbuds 110, 120 may include one or more outputs devices, such as output devices 113, 123 respectively. For instance, output devices may include one or more speakers, transducers or other audio outputs, a user display, a haptic interface or other tactile feedback that provides non-visual and non-audible information to the user. For example, speakers in output devices 113, 123 may be used to play music, emit audio for navigational or other guidance, for multimedia files, for voice calls, for translated speech, etc.

Wireless earbuds 110, 120 may include one or more sensors, such as sensors 115, 125 respectively. For instance, sensors may include a visual sensor, an audio sensor, a touch sensor, etc. Sensors may also include motion sensors, such as an Inertial Measurement unit ("IMU"). According to some examples, the IMU may include an accelerometer, such as a 3-axis accelerometer, and a gyroscope, such as a 3-axis gyroscope. The sensors may further include a barometer, a vibration sensor, a heat sensor, a radio frequency (RF) sensor, a magnetometer, and a barometric pressure sensor. Additional or different sensors may also be employed.

In order to obtain information from and send information to each other, as well as to other remote devices, wireless earbuds 110, 120 may each include a communication module, such as communication modules 130, 140 respectively. The communication modules may enable wireless network connections, wireless ad hoc connections, and/or wired connections. Via the communication modules 130, 140, the wireless earbuds 110, 120 may establish communication links, such as wireless links. The communication modules 130, 140 may be configured to support communication via cellular, LTE, 4G, WiFi, GPS, and other networked architectures. The communication modules 130, 140 may be configured to support Bluetooth®, Bluetooth LE, near field communications, and non-networked wireless arrangements. The communication modules 130, 140 may support wired connections such as a USB, micro USB, USB type C or other connector, for example to receive data and/or power from a laptop, tablet, smartphone or other device.

The communication modules 130, 140 may each include one or more antennas, such as first antenna 132 and second antenna 142 respectively. For instance, in the first earbud 110, the first antenna 132 may be configured for transmitting and/or receiving signals at a first frequency range, and in the second earbud 120, the second antenna 142 may also be configured for transmitting and/or receiving signals at the first frequency range. As such, the first earbud 110 and the second earbud 120 may communicate with each other at the first frequency range via their respective first antenna 132 and second antenna 142. For example, the first frequency range may be a radio frequency range, such as between 2.402 GHz-2.480 GHz for Bluetooth® signals. As other examples, the first frequency range may be a radio frequency range for WiFi signals, LTE signals, or other signals. In some instances, the communication modules 130, 140 may include additional antennas for transmitting and/or receiving signals at other frequency ranges, such as for LTE signals, WiFi signals, GPS signals, etc. The communication modules 130, 140 may include antenna control circuits 134, 144. For example, the antenna control circuits 134, 144 may include a baseband section for processing data and a transceiver section for transmitting data to and receiving data via the antennas.

The communication modules 130, 140 may be configured to measure signal strengths for wireless connections. For instance, wireless connections may be established between the wireless earbuds 110, 120 and beacons attached at various locations. For another instance, wireless connections may be established between the wireless earbuds 110, 120 and other remote devices. For example, communication modules 130, 140 may be configured to measure received signal strength indicator (RSSI) of a Bluetooth® connection. RSSI is an indication of power level being received at a receiver after antenna loss and other losses, such as cable loss. In some instances, communication modules 130, 140 may be configured to transmit the measured RSSI to another device, including to each other and/or another remote device.

Although not shown, the wireless earbuds 110, 120 may also include other additional components. For instance, the wireless earbuds 110, 120 may include a position determination module, which may include a GPS chipset or other positioning system components. Information from the sensors and/or from data received or determined from remote devices (e.g., wireless base stations or wireless access points), can be employed by the position determination module to calculate or otherwise estimate the physical location of the wireless earbuds 110, 120. For another instance, the wireless earbuds 110, 120 may each include one or more internal clocks. The internal clocks may provide timing information, which can be used for time measurement for apps and other programs run by the computing devices, and basic operations by the computing devices, sensors, inputs/outputs, GPS, communication system, etc.

Figure 3:
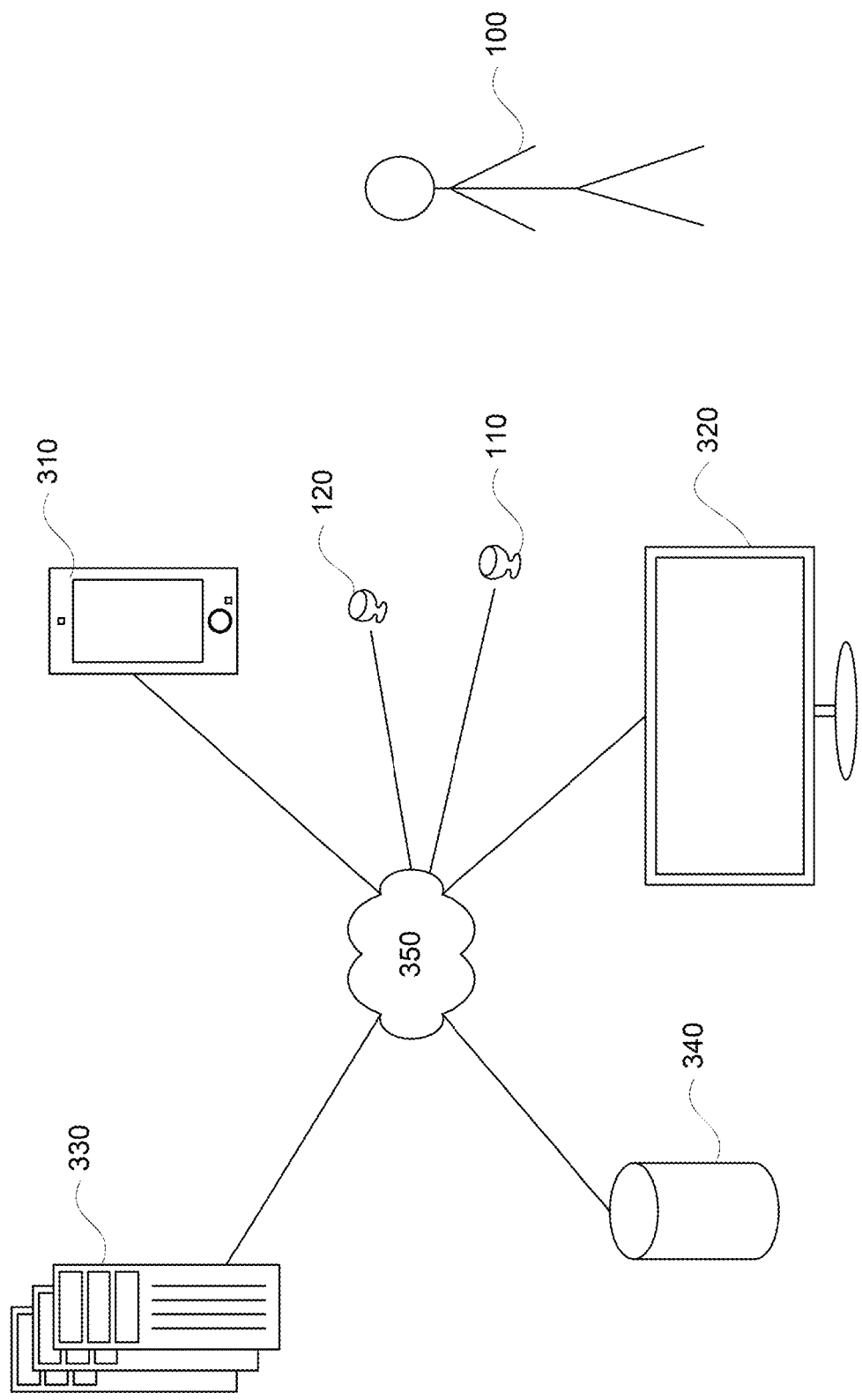
FIG. 3 is a block diagram of an example system including the example pair of wireless earbuds of FIGS. 1A-B in accordance with aspects of the disclosure.

Using the communication modules 130, 140, wireless earbuds 110, 120 may communicate with other devices in a system via a network. For instance, FIG. 3 is a pictorial diagram illustrating an example system 300 in which the features described herein may be implemented. The system 300 may include the wireless earbuds 110, 120, computing devices 310, 320, 330, and a storage system 340. As shown, the wireless earbuds 110, 120, computing devices 310, 320, 330, and storage system 340 can each be at different nodes of a network 350 and capable of directly and indirectly communicating with other nodes of network 350. Although only a few computing devices are depicted in FIG. 3, it should be appreciated that a typical system can include a large number of connected computing devices, with each different computing device being at a different node of the network 350.

The network 350 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Each of the computing devices 310, 320, 330 may be configured similarly to the wireless earbuds 110, 120, with one or more processors, memory and instructions as described above. For instance, computing devices 310 and 320 may each be a client device intended for use by the user 100, and have all of the components normally used in connection with a personal computing device such as a central processing unit (CPU), memory (e.g., RAM and internal hard drives) storing data and instructions, user inputs and/or outputs, sensors, communication module, positioning system, clock, etc. For example, communication modules of computing devices 310, 320 may similarly include one or more antennas for transmitting and/or receiving signals, such as Bluetooth® signals, and may also be configured to measure signal strengths of communication links. For another example, computing devices 310, 320 may have the same and/or different types of user inputs and/or outputs as wireless earbuds 110, 120, such as a screen or touchscreen for displaying texts, images, videos, etc. For another instance, computing device 330 may be a server computer and may have all of the components normally used in connection with a server computer, such as processors, and memory storing data and instructions.

The computing devices 310, 320, and 330 may each comprise a full-sized personal computing device, or may alternatively comprise mobile computing devices capable of wirelessly exchanging data with a server over a network such as the Internet. For example, computing device 310 may be a mobile device, such as a mobile phone as shown in FIG. 3, or some other mobile device such as a wireless-enabled PDA. For another example, computing device 320 may be a smart TV as shown in FIG. 3, or some other computing device such as a desktop or laptop computer, or other smart device that is capable of obtaining information via communication links. In other examples (not shown), system 300 may additionally or alternatively include wearable devices, such as a smartwatch, a head mount device, etc.

As with memories 114, 124, storage system 340 can be of any type of computerized storage capable of storing information accessible by one or more of the wireless earbuds 110, 120, and computing devices 310, 320, 330, such as a hard-drive, memory card, ROM, RAM, DVD, CD-ROM, write-capable, and read-only memories. In addition, storage system 340 may include a distributed storage system where data is stored on a plurality of different storage devices which may be physically located at the same or different geographic locations. Storage system 340 may be connected to the computing devices via the network 350 as shown in FIG. 3 and/or may be directly connected to any of wireless earbuds 110, 120, and computing devices 310, 320, 330.

Example Methods

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 4A:
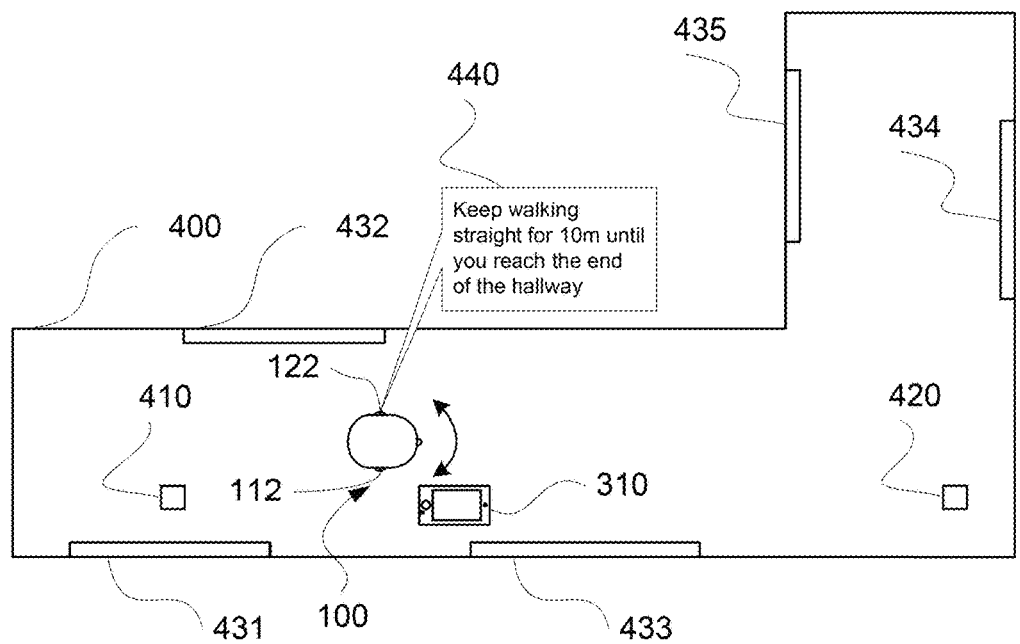
FIGS. 4A and 4B illustrate an example of providing navigation guidance using the pair of wireless earbuds of FIGS. 1A-B in accordance with aspects of the disclosure.
Figure 4B:
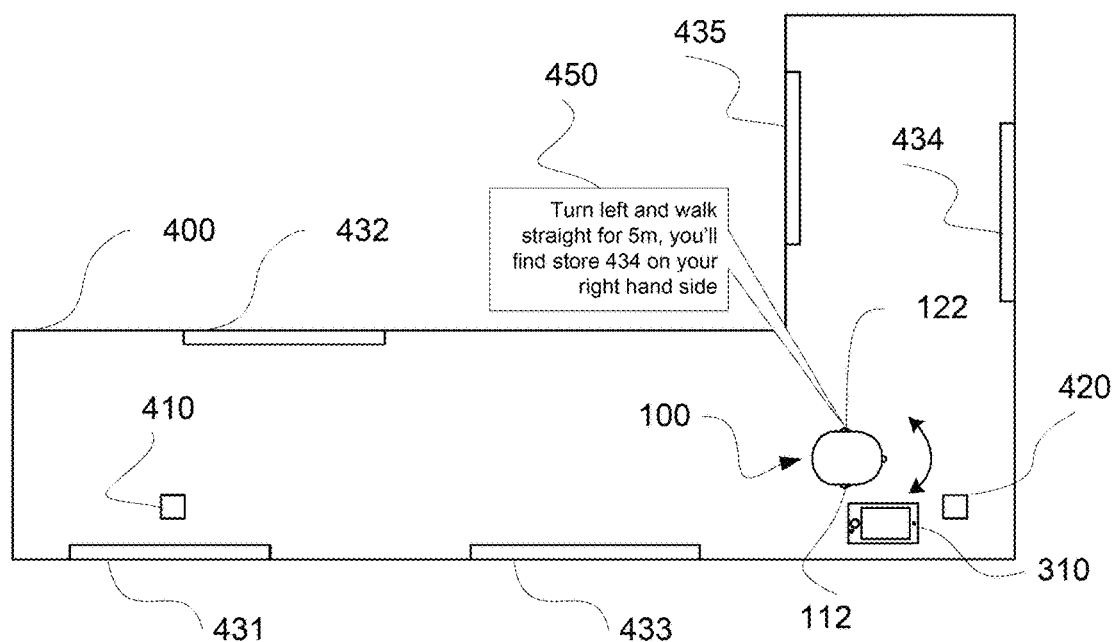

FIGS. 4A and 4B illustrate an example of providing navigation guidance using position determinations of the pair of wireless earbuds shown in FIGS. 1A-B. Referring to FIG. 4A, the user 100 is shown in an indoor environment 400. The indoor environment 400 may be a shopping mall including many stores, such as stores 431, 432, 433, 434, 435. The indoor environment 400 may have various beacons installed at fixed locations, such as attached to or positioned inside a wall or a ceiling. For example, beacon 410 is shown attached to the ceiling near store 431 and store 432, beacon 420 is shown attached to the ceiling near end of a hallway. For example, the beacons may be Bluetooth® or BLE beacons. In other examples, beacons 410 and/or 420 may be LTE access points or WiFi hotspots, or other communication modules. The locations of the beacons, the locations of the various stores relative to the beacons, as well as identifiers of the beacons, may be stored in one or more storage systems accessible to user devices. For example, the information may be stored in storage system 340 connected to the network 350.

While in the shopping mall, the wireless earbuds 110, 120 may receive a request for navigation guidance. For instance, the user 100 may input a request for navigation guidance to reach a destination, such as a particular store 434 via the user inputs 111, 121 of the wireless earbuds. For example, one or more microphones in user inputs 111, 121 may receive a voice command from the user 100 requesting navigation guidance.

Alternatively or additionally, the wireless earbuds 110, 120 may receive a request for navigation guidance from another electronic device being used by the user 100. For example, the wireless earbuds 110, 120 may be paired with mobile phone 310, such as via Bluetooth®. The user 100 may input the request for navigation guidance via one or more user inputs of the mobile phone 310, such as via a touchscreen. The mobile phone 310 may then transmit the navigation request to the processors 112, 122 of the wireless earbuds 110, 120. In some instances, user authentication may be required before pairing the wireless earbuds 110, 120 with other devices of the user 100.

Once the navigation request is received, processors 112, 122 may control the first antenna 132 and the second antenna 142 to receive signals from beacons installed in the indoor environment 400. For example, the first antenna 132 and the second antenna 142 may receive signals from the first beacon 410 and/or the second beacon 420. The processors 112, 122 may then control the communication modules 130, 140 to measure a signal strength of the first beacon 410 based on signals received by both the first antenna 132 and the second antenna 142.

Using signals from the two antennas 132, 142 housed in two wireless earbuds 110, 120 may mitigate various effects that could otherwise degrade and/or alter quality of signals received from a beacon, as described herein.

Poor signal quality may affect signal strength measurements for a beacon, which may in turn negatively impact accuracy in position determinations based on these signal strength measurements. For example, FIGS. 5A-5D illustrate example effects that may negatively impact signal strength measurements using a single antenna.

Figure 5A:
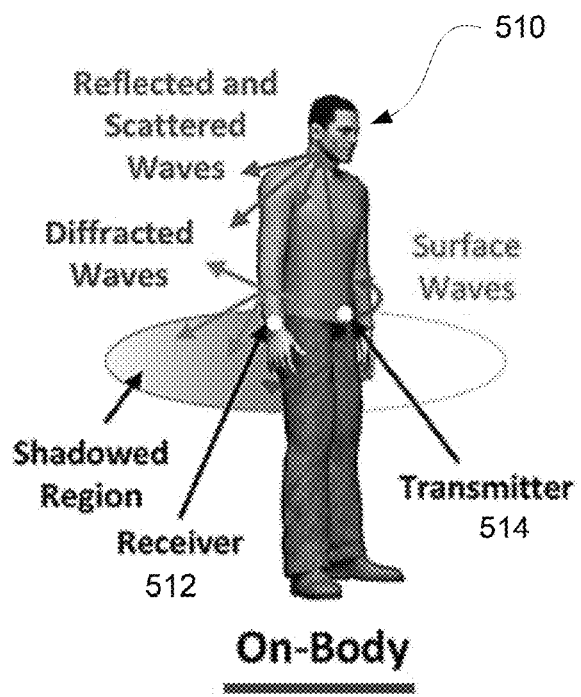
FIG. 5A illustrates example shadowing effects on a single antenna in a wearable electronic device from a user wearing the electronic device in accordance with aspects of the disclosure.

FIGS. 5A-5D illustrate some example effects that may negatively impact signal strength measurements using a single antenna. Referring to FIG. 5A, a user 510 is shown wearing two wearable devices (shown as white circles). The wearable devices may include various antennas, such as a receiver 512 and a transmitter 514. The receiver 512 may receive signals from a beacon (not shown). However, the body of the user 510 may have shadowing effects on the received signals. For example, signal waves within a distance from the body of the user 610 ("shadowed region") may be reflected or scattered off the body of the user 510 before being received by the receiver 512.

Signal waves within the shadowed region may also be diffracted by the body of the user 510 into multiple waves. For example, and as further shown in FIG. 5A, the transmitter 514 in another wearable device worn by the user 510 may also generate signal waves ("surface waves"). These surface waves may be received by the receiver 512. As such, these reflected, scattered, diffracted, and surface waves may affect RSSI measurements based on signals received by the receiver 512, which may then impact the accuracy in position determinations based on the RSSI measurements.

Figure 5B:
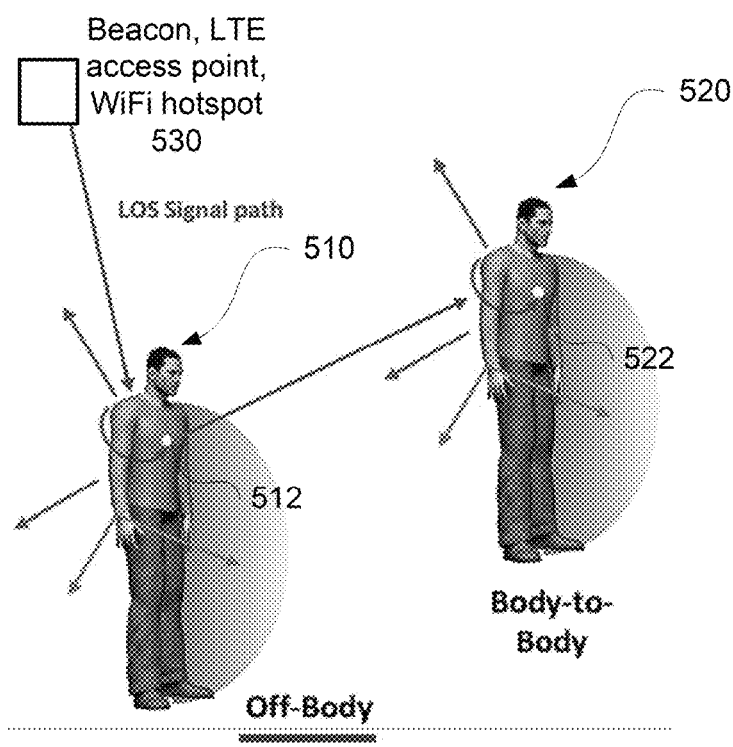
FIG. 5B illustrates example shadowing effects on a single antenna in a wearable electronic device from other persons around the wearable electronic device in accordance with aspects of the disclosure.

In addition to these shadowing effects, position determinations by a wearable device may be further degraded by other objects, including other persons in the vicinity of the wearable device. Referring to FIG. 5B, the receiver 512 in a wearable device worn by the user 510 may receive signals through a line-of-sight signal path ("LOS signal path") from a beacon 530 (or as shown may alternatively be LTE access point, WiFi hotspot, etc.), and make RSSI measurements based on these received signals. Another receiver 522 in another device worn by another user 520 may not receive signals from the beacon 530 through a LOS signal path. Instead, the signals may be received indirectly after being reflected, scattered, and/or diffracted off the body of user 510, thereby decreasing the RSSI measurements of the signals received by receiver 522. The decreased RSSI measurements may negatively affect the accuracy in position determinations by wearable device based on RSSI measurements.

Figure 5C:
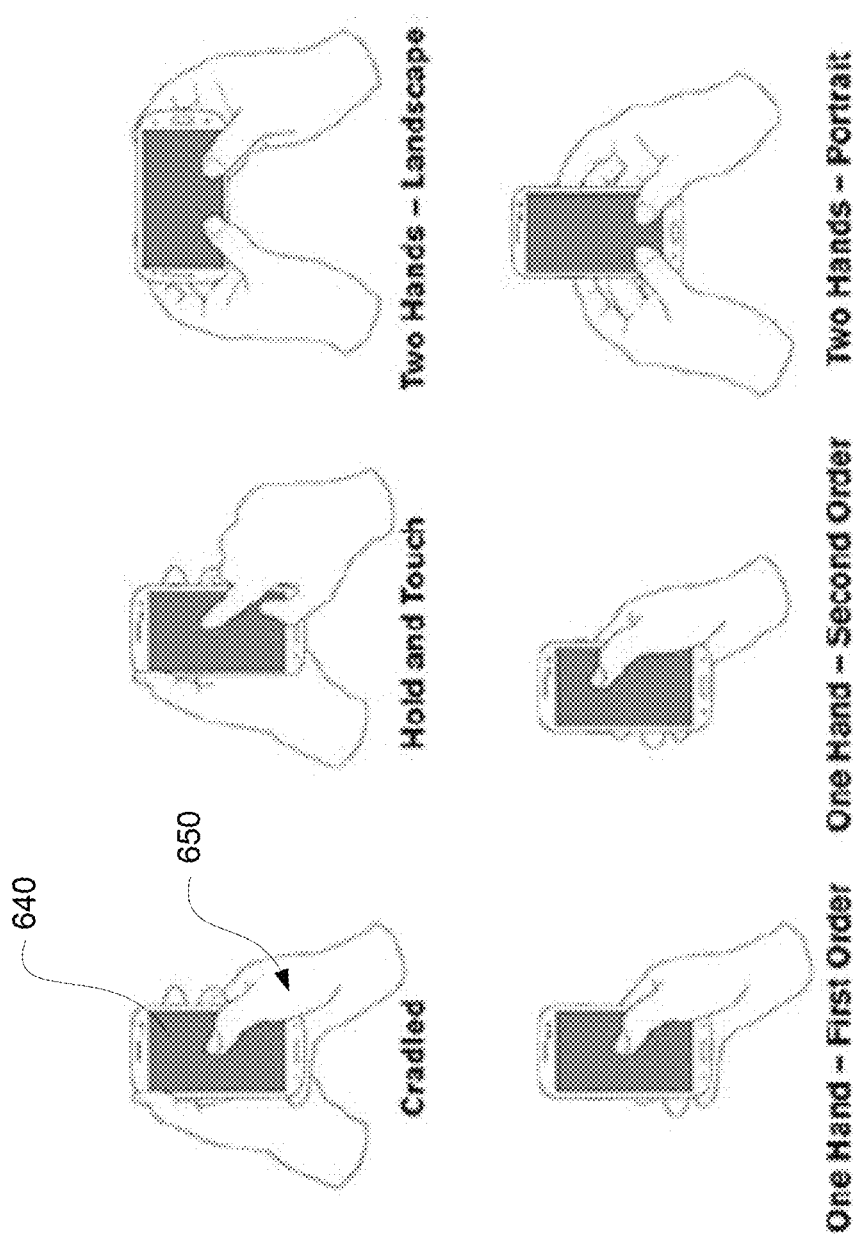
FIG. 5C illustrates example ways a user may hold a phone in accordance with aspects of the disclosure.

Such shadowing effects are not limited to wearable devices, for instance, FIG. 5C shows example ways that a mobile phone 540 may be held by a user. Depending on how the phone 540 is being held by user 550 and the orientation of the phone 540, radiation patterns of an antenna in the phone 540 may vary even though the phone 540 remains in a same position with respect to a beacon. As such, RSSI measurements for signals received at the antenna in the phone 540 may vary even without any change in position of the phone. In other examples (not shown), radiation patterns of an antenna in the phone 540 may also vary depending on how the phone 540 is positioned with respect to other portions and/or clothing of a user, such as how the phone 540 is positioned inside a pocket (e.g., front or back pocket, tightly or loosely against clothing, thickness of the clothing material, etc.).

Figure 5D:
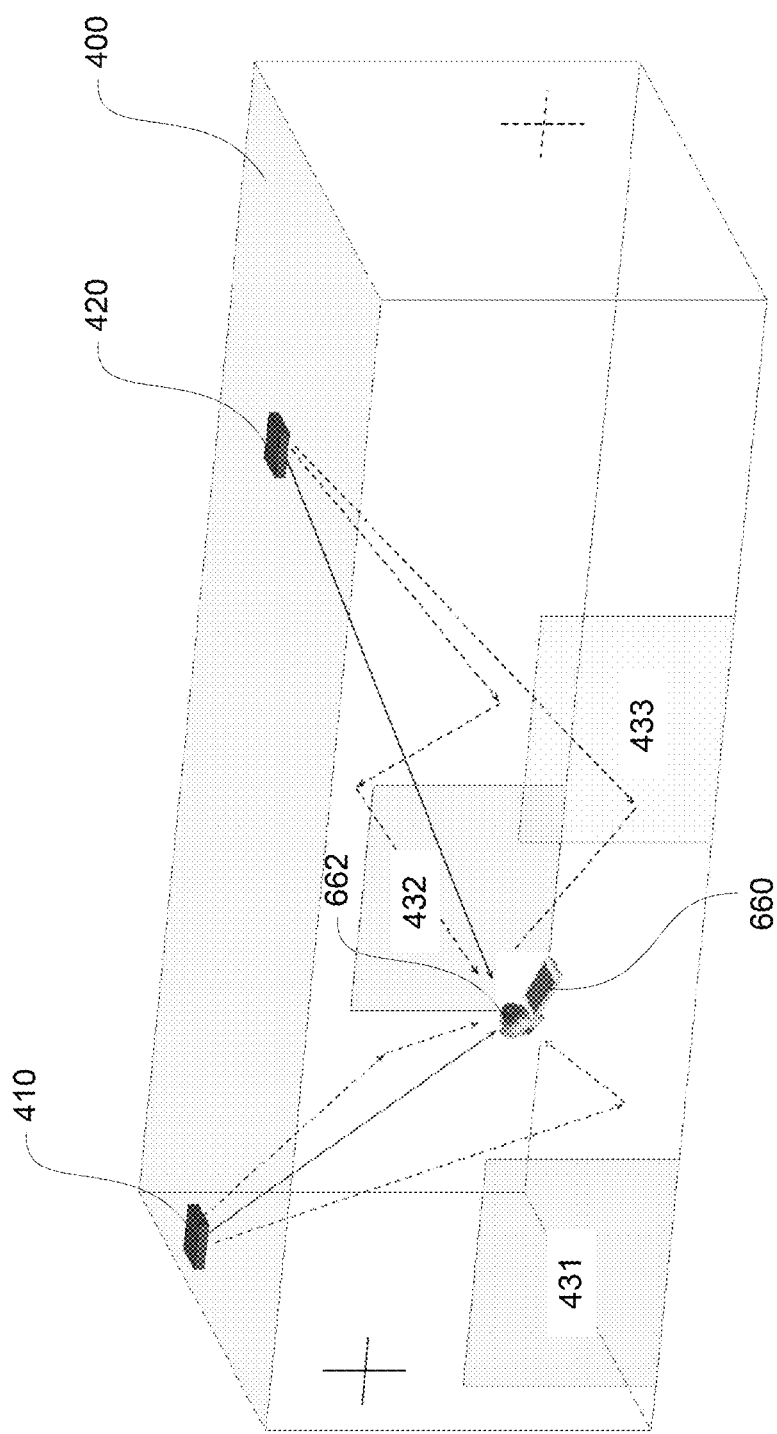
FIG. 5D illustrates example multi-path effects on a single antenna in a phone in accordance with aspects of the disclosure.

Still further, FIG. 5D illustrates multi-path effects that may further degrade accuracy in position determinations based on RSSI measurements. FIG. 5D shows mobile phone 560 in a segment of the indoor environment 400 in a perspective view. As shown, indoor environment 400 includes surfaces that may have significant effects on signal transmission, such as walls, floors, and ceilings. For example as shown, signals from a first beacon 410 may directly reach an antenna in the phone 560 (solid line), but may also indirectly reach the antenna in the phone 560 after being reflected, scattered, and/or diffracted off walls (dotted lines). Likewise, signals from a second beacon 420 may directly reach an antenna in the phone 560, but may also indirectly reach the antenna in the phone 560 after being reflected, scattered, and/or diffracted off walls (dotted lines). Such reflected, scattered, and/or diffracted signals also contribute to the RSSI measurements, which may negatively affect accuracy in position determinations based on these RSSI measurements.

Figure 6A:
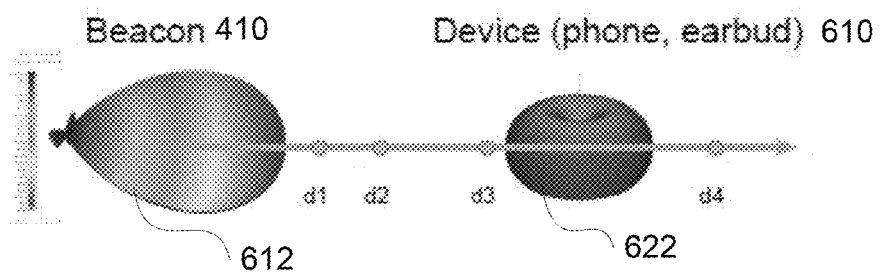
FIGS. 6A and 6B illustrate example signal strength measurements using a single antenna in accordance with aspects of the disclosure.
Figure 6B:
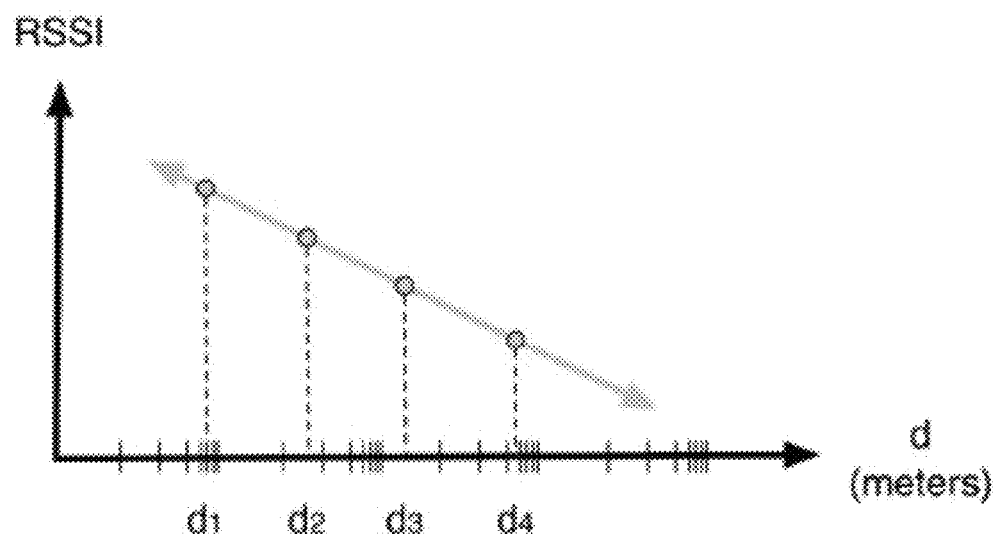

In order to address these issues, such as shadowing, multi-path, etc., positions may be determined by using multiple antennas in multiple devices, such as using both the first antenna 132 of the first earbud 110 and the second antenna 142 of the second earbud 120 described in the example systems above. FIGS. 6A and 6B show example signal strength measurements using a single antenna. FIGS. 7A-10B then illustrate how such signal strength measurements using two antennas may be used in diversity and MIMO schemes to mitigate the shadowing, multi-path, and other effects.

Referring to FIG. 6A, a three dimensional plot 500A shows radiation patterns from the beacon 410 and an antenna in a device 610 at various distances along an axis, including at d1, d2, d3, d4, from the beacon 410, with d1 being the closest location to the beacon 410 and d4 being the furthest distance from the beacon 410. For instance, the radiation patterns may show antenna gain at various angles in three dimensional space. The device 610 may be any type of a mobile user device, such as the first earbud 110, the second earbud 120, or some other mobile device such as mobile phone 310 shown in FIG. 3. As further shown in FIG. 6A, beacon 410 may generate a radiation pattern 612 when transmitting signals. The radiation pattern 612 is strongest in intensity at a point where signal waves originate from the beacon 410, and decreases in intensity with increasing distance from the beacon 410. An antenna in device 610 may also generate a radiation pattern 622, such as when receiving signals from the beacon 410. As further shown in FIG. 6A, the radiation pattern 622 of the antenna may have a toroid shape, where the intensity may be strongest at points closest to the antenna, and decreases in intensity with increasing distance from the antenna. The radiation patterns shown in FIG. 6A are not limiting and other radiation patterns may be possible, such as radiation patterns which are weaker at the points closest to the devices (e.g., beacon 410, device 610, etc.), and stronger at locations further away from the devices.

FIG. 6B shows a plot 600B of received signal strength indicator (RSSI) measurements for signals received from beacon 410 by an antenna in device 610 at various distances along an axis, including at d1, d2, d3, d4, from the beacon 410. For example as shown, d1 is closer to the beacon 410 than d4. As shown, RSSI measurements of signals transmitted by the beacon 410 and received at the antenna in device 610 may be highest when a distance between the beacon 410 and the device 610 is smallest, and decreases as the distance between the beacon 410 and the device 610 increases.

In many instances, signal strength pattern from a Bluetooth® beacon (and/or LTE access points, WiFi hotspots, etc.) may be represented by a series of concentric rings, where each ring is a predetermined distance from the beacon, and each ring has a known signal strength value or RSSI. Therefore, based on the measured RSSI, a distance between the device 610 and the beacon 410 may be determined. For example, a signal strength may correspond to a ring with distance d1 from the beacon 410. For another example, where a signal strength is between two known signal strength values for two consecutive rings, a distance may be determined by taking an average or weighted average of the distances for the two consecutive rings.

In some instances (though not shown), device 610 may determine distances to a plurality of beacons by measuring RSSI for communication links with these beacons. Where the plurality of beacons have known locations, device 610 may pinpoint its position based on the determined distances to these beacons.

Figure 7A:
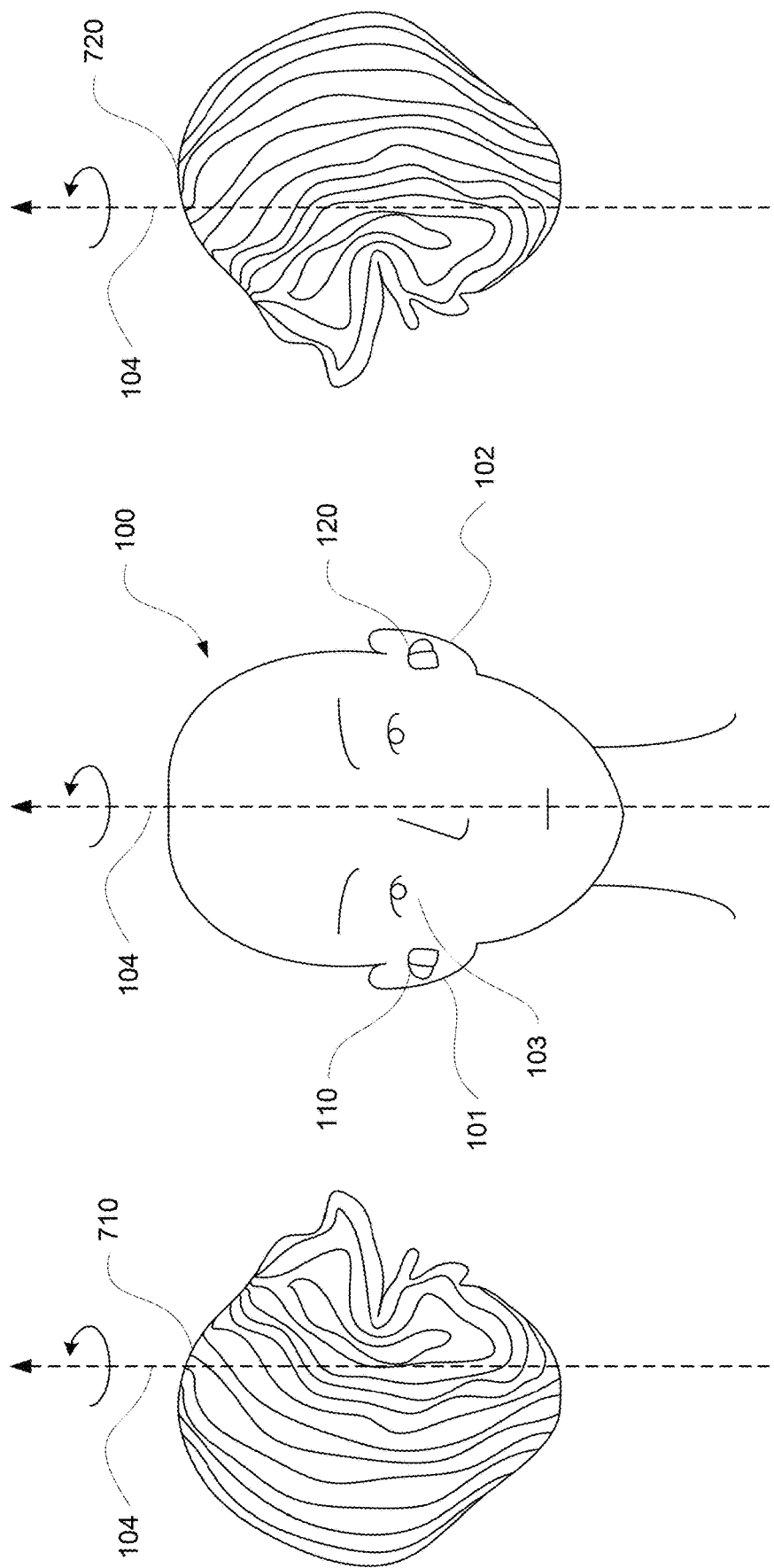

Position relative to the beacon may be determined using signals from multiple antennas in multiple devices, such as using both the first antenna 132 of the first earbud 110 and the second antenna 142 of the second earbud 120 described in the example systems above. FIGS. 7A and 7B illustrate example three-dimensional radiation patterns for the two antennas 132, 142 of the wireless earbuds 110, 120 viewed in front of the user 100 and viewed from the top of the user 100, respectively. A first radiation pattern 710 is shown for the first earbud 110, and a second radiation pattern 720 is shown for the second earbud 120. For instance, the lines shown inside first radiation pattern 710 and second radiation pattern 720 may represent contours or gradients of antenna gain values. In this regard the first radiation pattern 710 may be the radiation pattern when Bluetooth® signals are received at the first antenna 132 of the first earbud 110, while the second radiation pattern 720 may be the radiation pattern when Bluetooth® signals are received at the corresponding second antenna 142 of the second earbud 120 at or around the same time.

In some instances, the first antenna 132 and the second antenna 142 may be configured to only receive signals from beacons (as opposed to also transmitting signals) when used for positioning and/or directional determinations in order to save energy or battery life. Although the example is described with respect to Bluetooth® signals, alternatively the radiation patterns 710 and/or 720 may result from other types of received signals, such as from an LTE access point or WiFi hotspot. Although the two radiation patterns are shown in this example as mirror images of each other for ease of illustration, the two radiation patterns may not necessarily be mirror images. Variations in how the two wireless earbuds are being worn by the user, various effects discussed above (such as shadowing, multi-path, etc.), may cause differences in the two radiation patterns.

Using antennas in wireless earbuds for RSSI measurements may increase accuracy in position determinations in a number of ways. For instance as described in detail below, since the two antennas are incased in different housings and insulated by a user's head when being worn, antennas in two wireless earbuds may provide both spatial diversity (e.g., separation distance) and radiation diversity (e.g., differences in directivity). Signals received by the two antennas in the two wireless earbuds may also have lower coupling effects due to the separation and isolation provided by the user's head. As discussed further below, such high diversity and low coupling effects of the antennas in the wireless earbuds allow diversity and MIMO schemes to be more effectively exploited to mitigate shadowing and/or multi-path effects.

Figure 8:
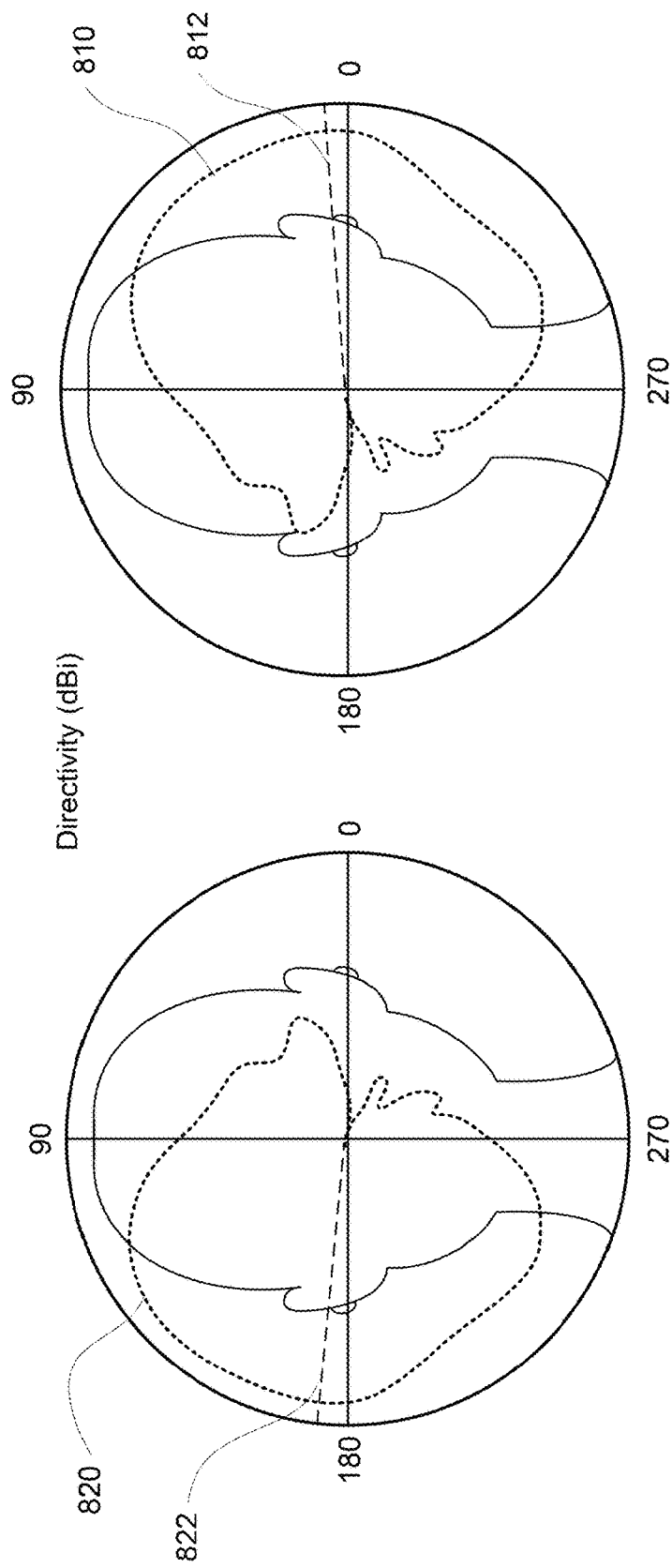
FIG. 8 illustrates example directivity for the two antennas in the pair of wireless earbuds shown in FIGS. 1A-1B in accordance with aspects of the disclosure.

For instance, and as shown in the example graphs of FIG. 8, directivity of an antenna may measure the degree to which the radiation pattern of the antenna is concentrated in a single direction. Directivity may measure a power density of an antenna in a direction of its strongest radiation as compared to a power density radiated by an ideal isotropic radiator which emits uniformly in all directions. FIG. 8 shows a two-dimensional plot of radiation pattern 810 for the first antenna 132 (in first earbud 110) and a radiation pattern 820 for the second antenna 142 (in the second earbud 120). For example, the radiation patterns 810, 820 may be antenna gain values on a vertical plane substantially parallel to a plane of the face of the user 100, such as a vertical plane including a cross-section of the first earbud 110 and second earbud 120. For example the vertical plane may include the axis 106 and normal to axis 105 shown in FIG. 7B.

As shown, radiation patterns for both antennas 132, 142 in wireless earbuds 110, 120 exhibit significant asymmetry. For instance, the strongest radiation direction 822 for the antenna 142 of the second earbud 120 is about 175 degrees about the horizontal axis 105; while the strongest radiation direction 812 for the antenna 132 of the first earbud 110 is about 5 degrees about the horizontal axis 105. Compare the radiation patterns 810, 820 with the radiation patterns shown in FIG. 6A, where the antenna in device 610 has a toroid shaped radiation pattern that is symmetrical about the antenna. In contrast, when worn by the user 100, due to the effects of the head of the user 100, the radiation pattern 710 of the first antenna 132 has one shape on the side facing away from the ear 101 and another shape on the side facing towards the ear 101. For instance, energy radiating towards the user 100 may be reflected or attenuated by the body of the user 100, as such, most of the energy from the antenna 132 may radiate outwards from the body of the user 100. Likewise, the radiation pattern 720 of the second antenna 142 has a different shape depending on a direction with respect to the ear 102 of the user 100. Further, because the wireless earbuds 110 and 120 are worn in relatively fixed positions with respect to the ears 101, 102 of the user 100, the directivity of the two antennas 132, 142 are also relatively fixed regardless of movements of the user 100.

Achieving such directivity may not be feasible for many other devices. For example, if two antennas are housed inside the mobile phone 540 shown in FIG. 5C, one or both of the antennas may change its directivity depending on how the user 550 is holding the mobile phone 540.

For another instance, FIG. 9 shows an example graph illustrating example coupling effects between the first antenna 132 of the first earbud 110 and the second antenna 142 of the second earbud 120. Graph 900 is a plot of s parameter for a frequency range including the Bluetooth® frequency range, which is between 2.4 GHz to 2.6 GHz. The s parameter for an antenna may describe the relationship between the input and the output of the antenna. For example, plot 910 (solid line) shows the relationship between the input and the output of the first antenna 132 ("S11") of the first earbud 110, while plot 920 (dash-dot line) shows the relationship between the input and the output of the second antenna 142 ("S22") of the second earbud 120. As shown, the first antenna 132 of the first earbud 110 and the second antenna 142 of the second earbud 120 are both configured to transmit and/or receive signals in the same frequency range centered around 2.465 GHz (shown as "m1"). Further, plot 930 (dash line) shows coupling effects between the first antenna 132 and the second antenna 142 ("S12"). For instance, plot 930 shows that antenna coupling between the first antenna 132 of the first earbud 110 and the second antenna 142 of the second earbud 120 is well below −60 dB. In other words, the isolation between the first antenna 132 of the first earbud 110 and the second antenna 142 of the second earbud 120 is well above 60 dB. The high level of isolation is another indication that the two antennas 132, 142 of the two earbuds 110, 120 exhibit a high level of diversity.

The isolation between the two earbud antennas may be significantly higher than two antennas housed inside a single device. For example, mobile devices used for navigation, such as smart phones and smart watches, typically may have very small form factors. As such, antennas housed inside such devices may have small separation distances between them, which may in turn create strong coupling effects between the antennas. In contrast, when being worn by a user, the first antenna 132 of the first earbud 110 and the second antenna of the second earbud 120 may have a separation distance of a width of a person's face. Further, instead of being inside the same housing, the first antenna 132 and the second antenna 142 are incased in different housings, and, when being worn, are further insulated by the head of the user 100.

In addition, because the wireless earbuds 110, 120 are worn inside ears, they are relatively more sheltered from signal waves reflected, scattered, and/or diffracted off other portions of the user 100 than, for example, other wearable devices shown in FIG. 5A. Likewise, the wireless earbuds 110, 120 are also more sheltered from other persons and objects in the user's surrounding than, for example, other wearable devices shown in FIG. 5B. Further, because the wireless earbuds 110, 120 are worn in relatively fixed positions, there may be less variation in body effects experienced by the wireless earbuds 110, 120 than, for example, the mobile phone 540 shown in FIG. 5C.

Figure 10A:
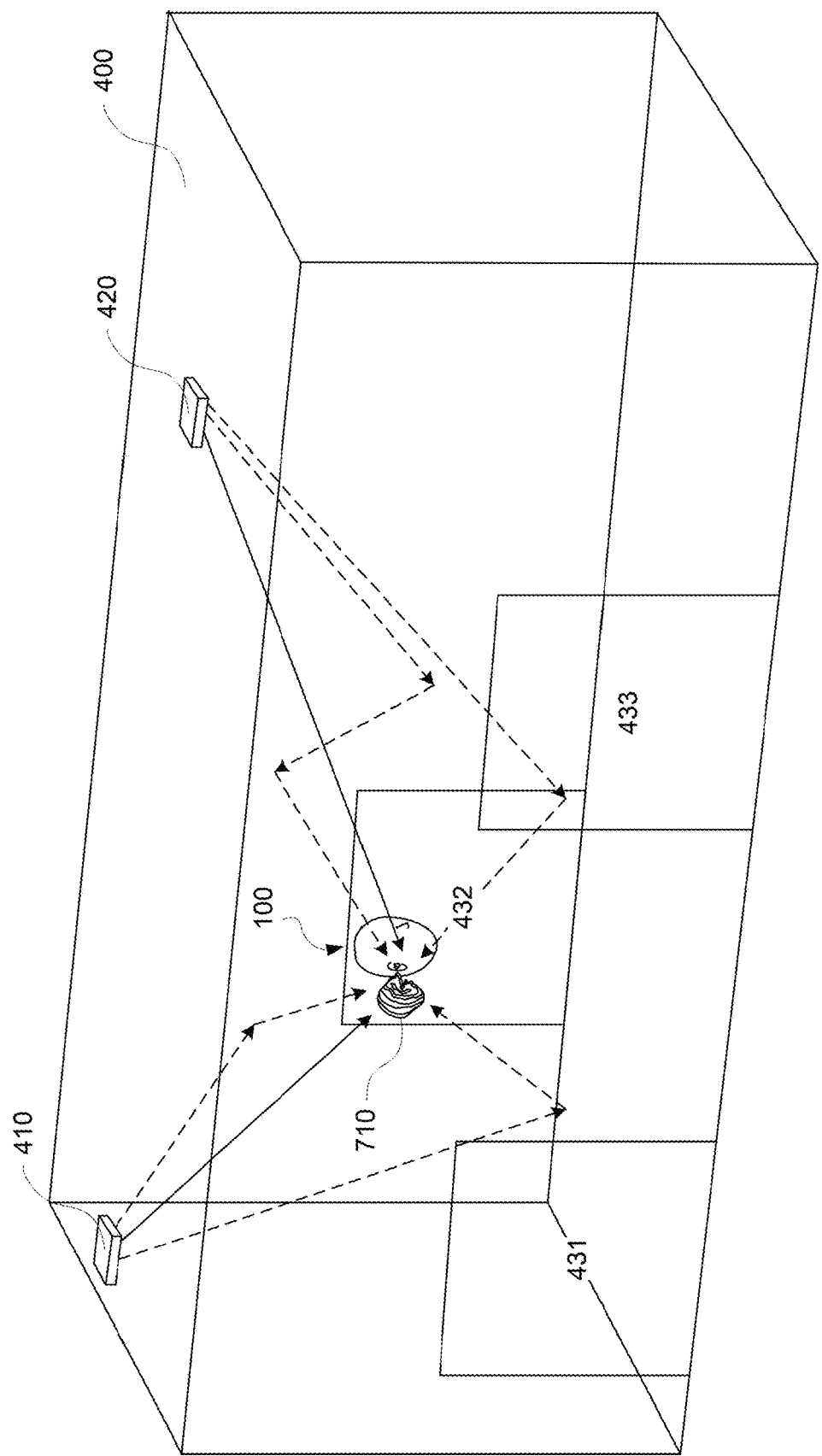
FIGS. 10A and 10B illustrate mitigating multi-path effects using the two antennas of the pair of wireless earbuds shown in FIGS. 1A-B in accordance with aspects of the disclosure.
Figure 10B:
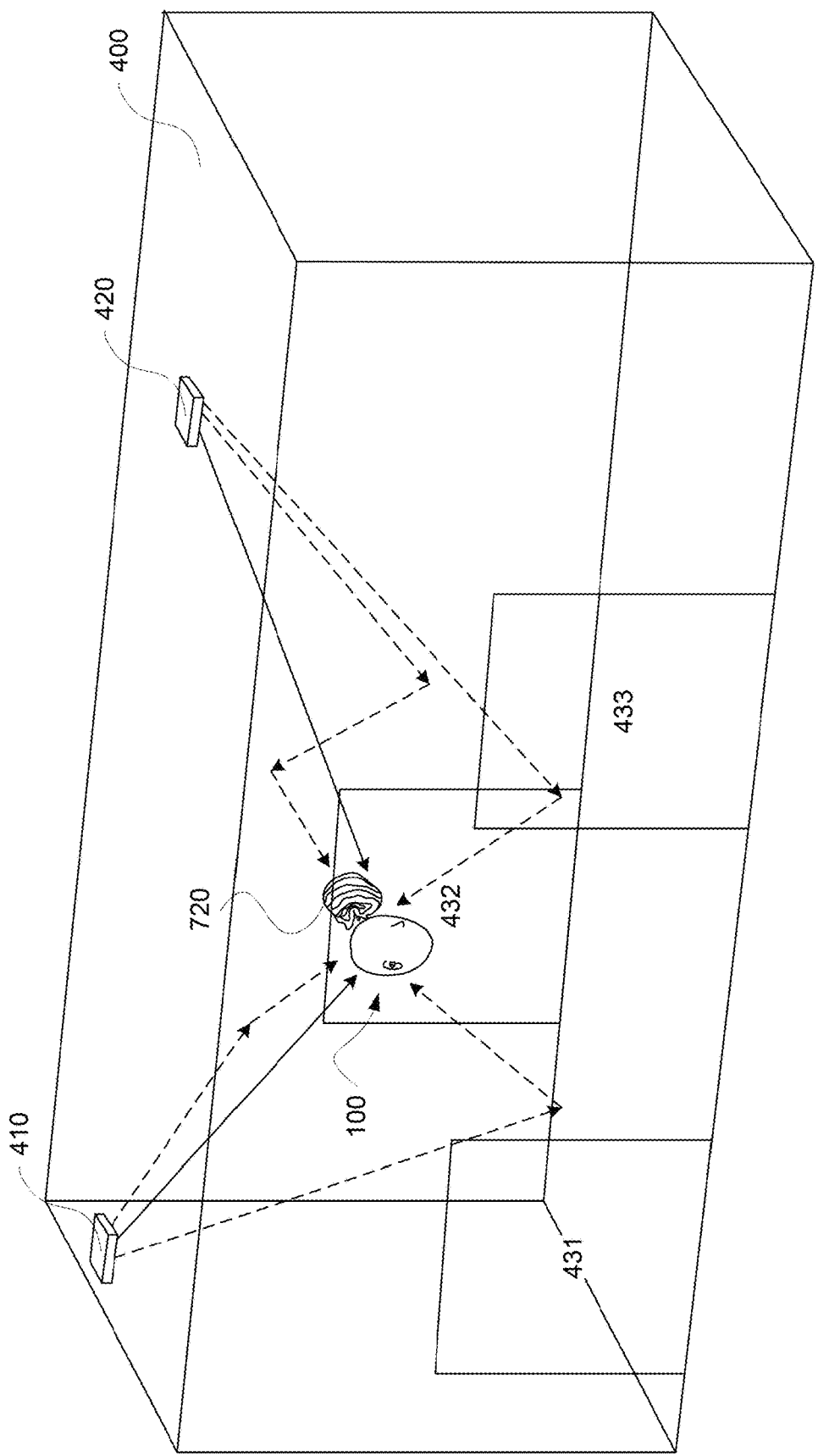

As mentioned above, the two antennas 132, 142 may be used to mitigate the negative impacts that multi-path effects may have on position determinations, which is illustrated by FIGS. 10A and 10B. FIGS. 10A and 10B shows a perspective view of the user 100 in a segment of the indoor environment 400. As shown, the indoor environment 400 includes various surfaces such as walls, floor, and ceiling, and as such, signals from the beacon 410 and 420 may directly reach the wireless earbuds 110, 120 (solid lines), but may also indirectly reach the wireless earbuds 110, 120 (dotted lines). As such, the radiation pattern 710 for earbud 110 may result from all direct, reflected, scattered, and/or diffracted signals from the beacon 410 or 420. Likewise, the radiation pattern 720 for earbud 120 may result from all direct, reflected, scattered, and/or diffracted signals from the beacon 410 or 420.

The redundancy of the two antennas 132, 142 create antenna diversity, which may help counter multi-path effects. For instance, the first antenna 132 and the second antenna 142 may be both configured to receive signals from the Bluetooth® frequency range, which in turn creates a redundancy of received Bluetooth® signals. Further as shown in FIGS. 7A-8 above, the two antennas 132, 142 exhibit both spatial diversity (separated by the head of user 100) and radiation diversity (difference in shape and directivity). In one aspect, antenna control circuit 134 and/or antenna control circuit 144 may compare the signal quality of a signal received by the antenna 132 with a signal received by the antenna 142 at or around the same time, and may select the received signal with the higher quality for position determinations. In another aspect, due to the high levels of directivity and isolation of the two antennas 132, 142, the reflected, scattered, and/or diffracted waves from multi-path effects are likely to impact signals received at the two antennas 132, 142 differently. As such, antenna control circuit 134 and/or antenna control circuit 144 may combine two signals received at the two antennas 132, 142 at or around the same time in order to reconstruct higher quality signals for RSSI measurements and position determinations.

MIMO techniques may be exploited using the two antennas 132, 142 of the wireless earbuds 110, 120. For instance, the two antennas 132, 142 may be used for simultaneously receiving two signals in a same frequency range (or channel), thereby creating two paths for receiving signals outputted from the channel ("MO"). Antennas 132, 142, may also be used for simultaneously transmitting two signals in a same frequency range (or channel), thereby creating two paths for transmitting signals to be inputted into the channel ("MI"). Such MIMO techniques may be used to increase data throughput and signal to noise ratios. Various types of MIMO techniques, such as precoding, spatial multiplexing, diversity coding, etc., may be used to improve signal quality in multi-path environment.

In addition to or as alternative to RSSI determinations, MIMO techniques can be used in positioning determination using other approaches. In some instances, using two or more approaches may further improve accuracy in positioning determinations. For example, Time-of-Flight (ToF) measurements may be used to determine position relative to a beacon. For instance, traveling time for incident radiation to reach the antennas 132, 142 of earbuds 110, 120 may increase as a result of increased distance. For example, traveling time for signals from a Bluetooth® beacon may be represented by a series of concentric rings, where each ring is a predetermined distance from the beacon, and each ring has a known traveling time per unit of distance. Therefore, based on the measured ToF, a distance between the earbuds 110, 120 (and therefore user 100 wearing the earbuds 110, 120) and the beacon 410 may be determined.

For another example, Angle of Arrival (AoA) measurements may be used to determine a propagation direction of a radio frequency wave incident on an antenna. For instance, difference in arrival time of incident radiation at multiple antennas, such as antenna 132 of first earbud 110 and antenna 142 of second earbud 120, may be determined. For example, based on the difference in arrival time for a radiation from a beacon, such as beacon 410, a propagation direction of the radiation from beacon 410 may be determined. As such, based on the measured AoA, a direction of earbuds 110 and 120 (and therefore user 100 wearing the earbuds 110, 120) relative to beacon 410 may be determined.

Referring again to FIG. 4A, based on the RSSI measurements (and/or the ToF, AoA measurements), processors 112, 122 may determine a current position of the user 100. For instance as described above with respect to FIG. 5B, a Bluetooth® beacon may have a known RSSI pattern, where RSSI values are known at predetermined distances from the beacon. For example, processors 112, 122 may determine based on RSSI measurement of signals received from beacon 410 that the user 100 is 5 m from beacon 410. At or around the same time, processors 112, 122 may also determine based on RSSI measurement of signals received from beacon 420 that the user is 10 m from beacon 420. As such, processors 112, 122 may determine that the user 100 is at a location between the beacon 410 and beacon 420. Additionally or alternatively, ToF and AoA measurements based on signals received by antennas 132, 142 of earbuds 110, 120 may be determined as described above for determining distance and/or direction relative to the beacon 410. Alternatively or additionally, communication modules 130, 140 may send RSSI measurements to another device of the user 100 within a communication range, such as mobile phone 310, so that processors of the mobile phone 310 may determine the current position of the user 100 based on the RSSI measurements.

In addition to determining a current position of the user 100. Processors 112, 122 may further determine based on the RSSI measurements a direction that the user 100 is facing. For instance, because the first earbud 110 and second earbud 120 have fixed positions with respect to the eyes 103 of the user 100 when being worn, processors 112, 122 may determine which direction the user 100 is facing by comparing a signal received by the first antenna 132 and a signal received by the second antenna 142 at or around the same time. For example, processors 112, 122 may compare the RSSI measurements of signals received by the two antennas 132, 142 at or around the same time. For example processors 112, 122 may determine based on RSSI measurements that the first earbud 110 is closer to the beacon 410 than the second earbud 120, and as such, the user 100 may be facing away from beacon 410. Additionally or alternatively, ToF and AoA measurements based on signals received by antennas 132, 142 of earbuds 110, 120 may be determined as described above for determining distance and/or direction relative to the beacon 410, based on which a facing direction of the user 100 may be determined.

Determination of the facing direction may be particularly accurate because of the strong directivity of the two antennas 132, 142. The facing direction of the user 100 may be used in generating navigation instructions, for example, if the user 100 is facing towards beacon 420, the user 100 should be instructed to walk forward to reach store 434, but if the user 100 is facing towards beacon 410, the user 100 should be instructed to turn around.

Additionally or alternatively, processors 112, 122 may determine the facing direction of the user 100 based on a movement of the user 100. For example, processors 112, 122 may determine that, between two time points, RSSI measurement for signals received from beacon 410 by the first earbud 110 increased while the RSSI measurement for signals received from beacon 410 by the second earbud 120 decreased, and conclude that the head of the user 100 is turning to the left. Also as described above, due to the high directivity of the two antennas 132, 142, the RSSI measurements may be particularly sensitive to change in facing direction of the user 100. As such, rather than trying to point a device such as mobile phone 310 in a certain direction to obtain navigation guidance, the user 100 may obtain updated navigation guidance from the wireless earbuds 110, 120 simply by making slight head movements.

In the instance where the user consents to the use of such data, processors 112, 122 may determine the current position and/or the facing direction of the user 100 additionally based on sensor data. For instance, when receiving the RSSI measurements (and/or ToF and AoA measurements) from the communication modules 130, 140, processors 112, 122 may also receive motion data from sensors 115, 125. For example, the motion data may include acceleration measurements from one or more accelerometers, orientation measurements from one or more gyroscopes, etc. The processors 112, 122 may correlate the RSSI measurements (and/or ToF and AoA measurements) with the motion data, for example by matching timestamps, in order to determine head orientations and movements of the user 100. Additionally or alternatively, processors 112, 122 may receive motion data from sensors in another device of the user 100, such as mobile phone 310. For example, due to the small form factors, it may not be practicable to include certain sensors, such as a magnetometer, inside the wireless earbuds 110, 120. As yet another alternative, processors of the mobile phone 310 may receive the RSSI measurements (and/or ToF and AoA measurements) from communication modules 130, 140 of the wireless earbuds 110, 120, sensor data from its own sensors and/or sensor data from sensors 115, 125 of the wireless earbuds 110, 120, and determine position and/or facing direction of the user 100 based on the RSSI measurements (and/or ToF and AoA measurements) and motion data.

Based on the current position and/or facing direction of the user 100, processors 112, 122 may determine navigation direction and distance in order to reach the requested destination. For instance, processors 112, 122 may access a storage system that stores the locations of the first beacon 410, the second beacon 420, and the store 434. Based on these stored locations and the current position and/or facing direction of the user 100, processors 112, 122 may determine that the distance and direction that the user 100 must move in order to reach store 434. Alternatively or additionally, processors of another device of the user 100, such as mobile phone 310, may determine the navigation direction and distance based on the current position of the user 100 and the locations stored in the storage.

Processors 112, 122 may then generate navigation instructions to be outputted to the user 100. For instance, processors 112, 122 may control one or more speakers or transducers in output devices 113, 123 to generate an audio output 440 instructing the user how to move towards the destination. Such audio output 440 may be more convenient for the user 100 than, for example, reading a display of a map and/or texts, particularly when the user 100 is walking. Alternatively or additionally, processors of another device of the user 100, such as mobile phone 310, may generate the navigation instructions to be outputted to the user 100. For example, processors of the mobile phone 310 may send navigation instructions to be outputted by the output devices 113, 123 of the wireless earbuds 110, 120, or alternatively or additionally to be outputted by output devices of the mobile phone 310 (such as displaying a map with arrows on a screen of the mobile phone 310).

As further shown in FIGS. 4A and 4B, in some instances the navigation instructions may be generated on a step-by-step basis. For example as shown in FIG. 4A, processors 112, 122 may generate audio output 440 instructing the user 100 to move in a first direction towards store 434. Processors 112, 122 may then monitor changes in the position and/or facing direction of the user 100 using RSSI measurements (and/or ToF and AoA measurements) of signals received by the first antenna 132 and the second antenna 142. Processors 112, 122 may then generate a next instruction based on a new position of the user 100. For example as shown in FIG. 4B, processors 112, 122 may determine based on RSSI measurements that the user 100 has reached the end of the hallway. Based on this determination, processors 112, 122 may generate an output 450 instructing the user 100 to turn left and move a certain distance to find store 434. As such, the wireless earbuds 110, 120 may be used to provide navigation guidance to the user 100 in an interactive way, similar to the way that instructions may be given by another person.

Figure 11A:
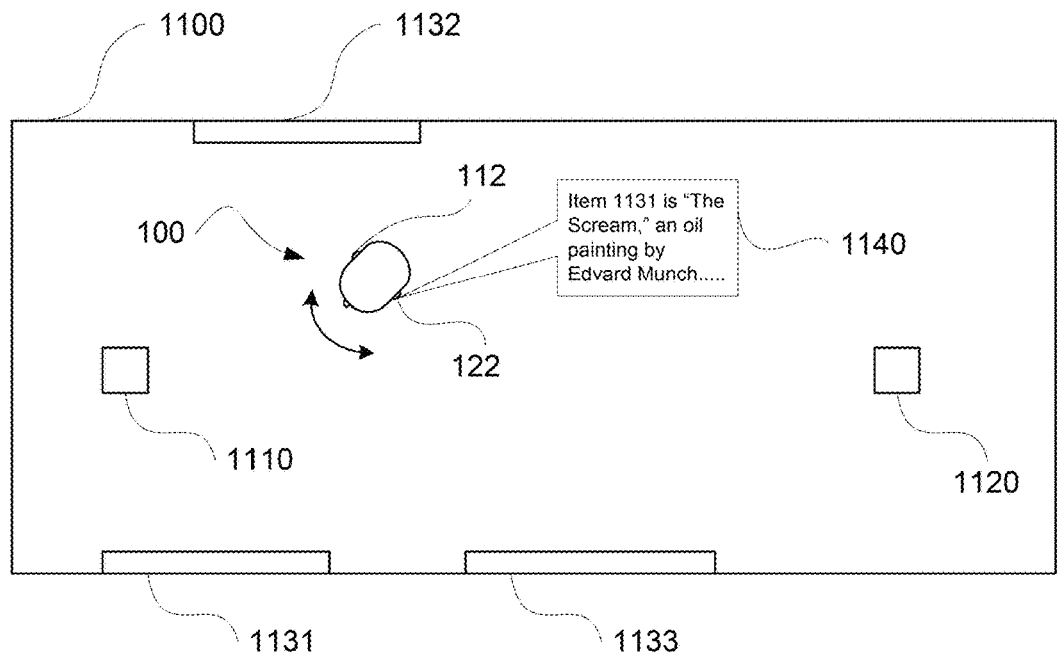
FIGS. 11A and 11B illustrate an example of providing information about an item using the pair of wireless earbuds of FIGS. 1A-B in accordance with aspects of the disclosure.
Figure 11B:
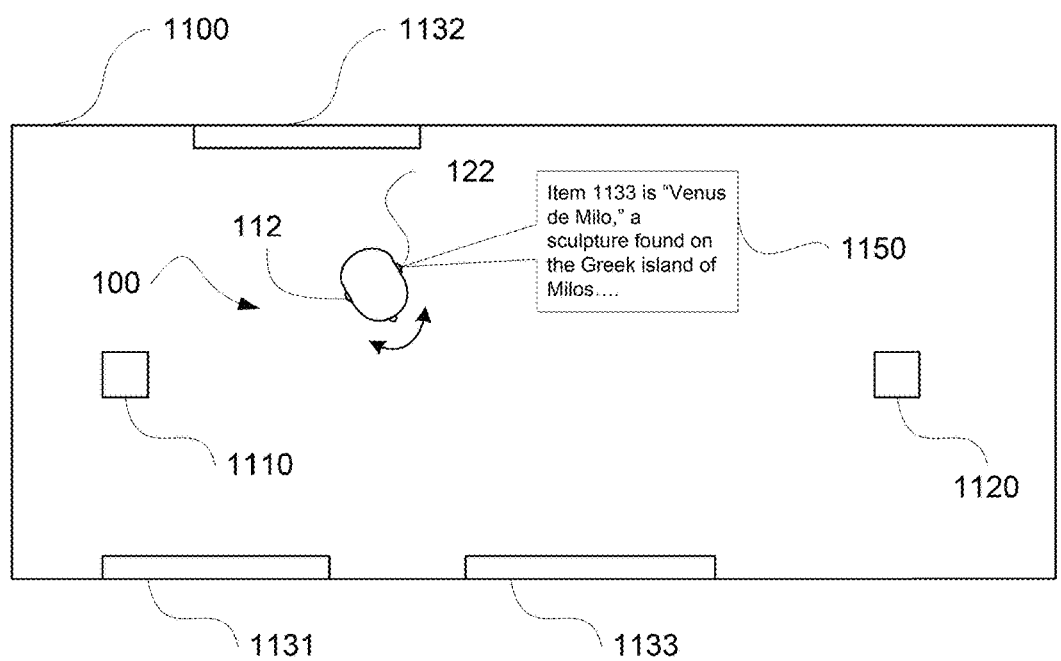

In another aspect, the wireless earbuds 110, 120 may be used to provide any of a number of other enhanced interactive experience. For instance, FIGS. 11A and 11B illustrate an example of providing additional information about an item using position and/or facing direction determinations of the pair of wireless earbuds shown in FIGS. 1A-B. As shown, user 100 is in an indoor environment 1100 including beacons installed at fixed locations, such as beacons 1110 and 1120. For example, the indoor environment 1100 may be a museum with various items on display, such as items 1131, 1132, and 1133. For instance, identifiers of the beacons, the locations of the beacons and the locations of the items relative to the beacons, as well as additional information about the items, may be stored in one or more storage systems accessible to user devices, such as via a network. The additional information may be any information relevant to the items, such as title, artist, dates, pricing, stories, etc.

For instance, during a visit to the museum, the user 100 may wish to learn more about various items while viewing them. As such, the user 100 may request additional information, for example via user inputs 111, 121 of the wireless earbuds 110, 120. As discussed above, processors 112, 122 may determine a current position and/or facing direction of the user 100 based on the RSSI measurements (and/or ToF and AoA measurements) of signals received from beacons 1110, 1120 by the first antenna 132 and the second antenna 142. Based on the position and/or facing direction, processors 112, 122 may determine which item the user 100 may be currently viewing. For example as shown in FIG. 11A, processors 112, 122 may determine that the user 100 is viewing item 1131, and as shown in FIG. 11B, processors 112, 122 may determine that the user 100 is viewing item 1133.

The processors 112, 122 may then access the stored additional information about the item that the user 100 is viewing, and control the output devices 113, 123 to generate an audio output including the additional information. For example as shown in FIG. 11A, an audio output 1140 may include information about item 1131 when the user 100 is facing in a direction of item 1131, and as shown in FIG. 11B, an audio output 1150 may include information about item 1133 when the user is facing in a direction of the item 1133. As such, even though the user 100 has not changed in position, based on the facing direction of the user 100, processors 112, 122 may generate output with relevant information for the user 100. Further as shown, even though the user 100 is also near item 1132 in FIGS. 11A and 11B, because the user 100 is not facing item 1132, processors 112, 122 may determine not to provide guidance information on item 1132. This way, relevant additional information may be seamlessly provided to the user 100 without requiring additional inputs from the user 100, for instance, the user 100 would not need to skip back and forth by pressing buttons on a traditional audio guide in order to find additional information on the relevant item.

Figure 12A:
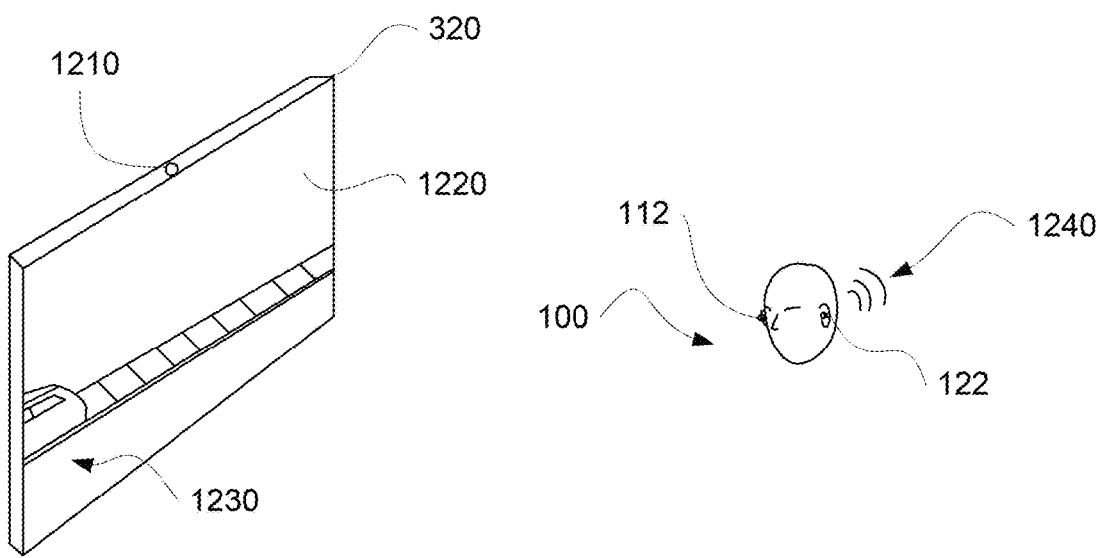
FIGS. 12A and 12B illustrate an example of providing augmented and/or virtual reality experience using the pair of wireless earbuds of FIGS. 1A-B in accordance with aspects of the disclosure.
Figure 12B:
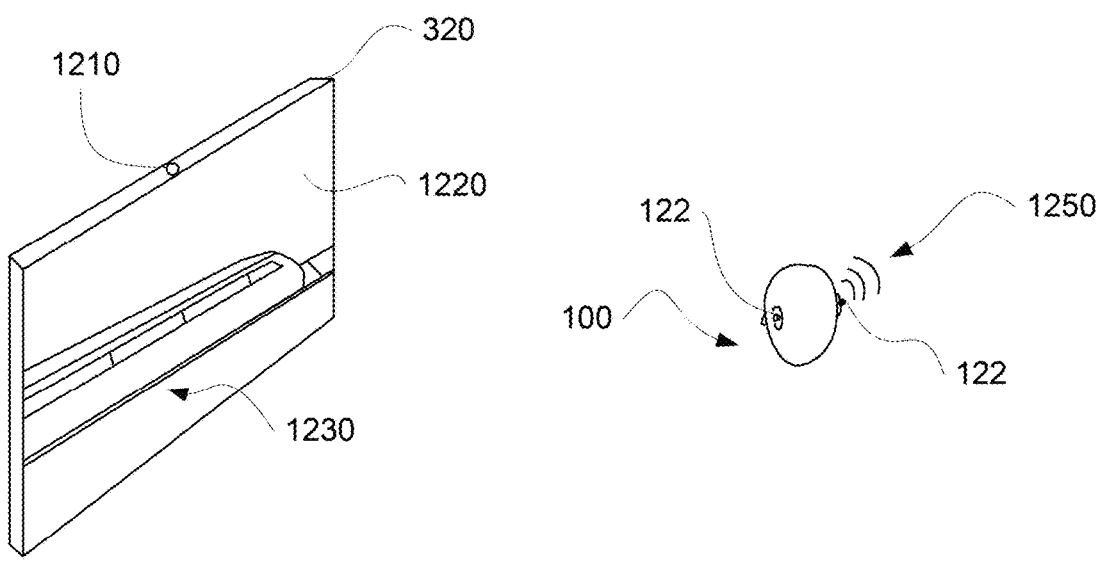

For another instance, FIGS. 12A and 12B illustrate an example of providing enhanced experience for augmented reality or virtual reality using position and/or facing direction determinations of the pair of wireless earbuds 110, 120. As shown, user 100 is in front of computing device 320. One or more beacons, such as beacon 1210, may be installed in the computing device 320, for example such as attached on top of the computing device 320 as shown. The identifiers of the beacons, the location of the beacon 1210 relative to other portions of the computing device 320, such as a display 1220, may be stored in a memory of the computing device 320 or some other storage accessible to the wireless earbuds 110, 120.

For instance, while watching a video shown on the display 1220 of computing device 320, the experience of the user 100 may be enhanced based on position and/or facing direction using the wireless earbuds 110, 120. For example, the user 100 may request an enhanced audio experience via user inputs 111, 121 of the wireless earbuds 110, 120. As discussed above, processors 112, 122 may determine a current position and/or facing direction of the user 100 based on the RSSI measurements (and/or ToF and AoA measurements) of signals received from beacon 1210 by the first antenna 132 and the second antenna 142. Based on the current position and/or facing direction of the user 100, processors 112, 122 may control audio output of the wireless earbuds 110, 120.

For example as shown in FIG. 12A, the user 100 may tilt her head to face in a direction towards a left edge of the display 1220, which may be due to the fact that the user is focusing her attention on an object 1230 near the left edge of the display 1220. As such, processors 112, 122 may control the wireless earbuds 110, 120 so that volume of audio output is higher in the second earbud 120 in the left ear 102. For another example as shown in FIG. 12B, the user 100 may tilt her head to face in a direction towards a right edge of the display 1220, which may be due to the fact that the user is following an object 1230 that is moving from the left to the right of the display 1220. As such, processors 112, 122 may control the wireless earbuds 110, 120 so that audio output 1240 gradually decreases in volume for the second earbud 120 in the left ear 102 and audio output 1250 gradually increase in volume for the first earbud 110 in the right ear 101. For still another example (not shown), the volume for the wireless earbuds 110, 120 may both increase or decrease based on whether the user 100 is moving towards or away from the display 1220.

The wireless earbuds 110, 120 may enhance user experience for augmented and/or virtual reality in other additional ways. For example in FIGS. 12A and 12B, the user may be playing a video game on computing device 320, where graphics are being shown on the display 1220. Computing device 320 may determine or receive position and/or facing direction of the user based on RSSI measurements of signals received by the two antennas 132, 142. Based on the position and/or facing direction, one or more processors of the computing device 320 may control the display 1220 to output images corresponding to a position and/or direction of the head of the user 100. For example, the processors of computing device 320 may determine that the user is rotating her head in one direction, for instance in the video game the user may be driving a vehicle that is making a sharp turn, and thus rotates the images on the display accordingly.

Although the examples shown in FIGS. 4A-B, 11A-B, and 12A-B illustrate three types of interactive experience, the wireless earbuds 110, 120 may be used to provide any type of interactive experience where position and/or facing direction of the user may be used. In some instances, the wireless earbuds 110, 120 may be used to provide a combination of interactive experiences. For example, while receiving guidance information about various items in the museum as shown in FIGS. 11A-B, the user 100 may want to take a break and visit a restaurant in the museum, as such, the wireless earbuds 110, 120 may help the user to navigate to the restaurant.

Figure 13:
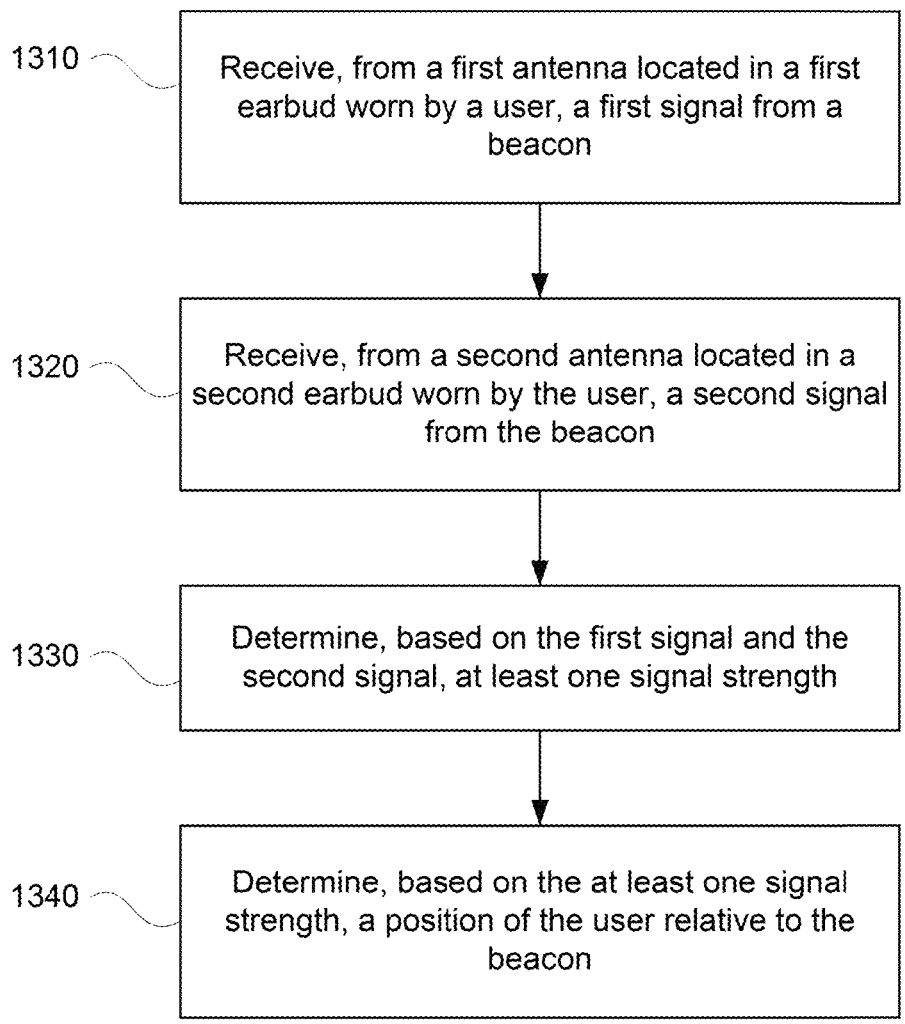
FIG. 13 is a flow diagram in accordance with aspects of the disclosure.

FIG. 13 shows an example flow diagram that may be performed by one or more processors, such as one or more processors 112, 122 of wireless earbuds 110, 120. For example, processors 112, 122 of wireless earbuds 110, 120 may receive data and make various determinations as shown in the flow diagram. Alternatively or additionally, some parts or all of the flow diagram may be performed by one or more processors of another electronic device in communication with the wireless earbuds 110, 120. Referring to FIG. 13, in block 1310, a first signal is received from a first antenna located in a first earbud worn by a user, the first signal from a beacon. In block 1320, a second signal is received from a second antenna located in a second earbud worn by the user, the second signal from the beacon. In block 1330, at least one signal strength is determined based on the first signal and the second signal, In block 1340, a position of the user relative to the beacon is determined based on the at least one signal strength.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
receiving, by one or more processors from a first antenna located in a first housing of a first earbud worn by a user, a first signal from a beacon;
receiving, by the one or more processors from a second antenna located in a second housing of a second earbud worn by the user, the second housing being different than the first housing, a second signal from the beacon;
determining, by the one or more processors based on the received first signal and the received second signal, a signal strength of the beacon;
determining, by the one or more processors based on the signal strength of the beacon, at least one of a distance between the user to the beacon or a position of the user relative to the beacon;
receiving, by the one or more processors, motion data from one or more sensors indicating a movement of the user; and
correlating, by the one or more processors, the motion data with the first signal and the second signal, wherein determining the distance between the user to the beacon or the position of the user relative to the beacon is further based on the correlated motion data.

2. The method of claim 1, wherein the first signal and the second signal are received using a same frequency channel.

3. The method of claim 1, further comprising:
controlling, by the one or more processors, one or more antenna control circuits to combine the first signal and the second signal, wherein the strength of the beacon is determined based on the combined signal.

4. The method of claim 1, further comprising:
determining, by the one or more processors, that a quality of the first signal is stronger than a quality of the second signal, wherein the signal strength of the beacon is determined based on the first signal.

5. The method of claim 1, further comprising:
receiving, by the one or more processors, a request for navigation instructions for reaching a destination;
accessing, by the one or more processors, a storage system to obtain a location of the destination relative to the beacon;
generating, by the one or more processors based on the location of the destination relative to the beacon and at least one of the distance between the user to the beacon or the position of the user relative to the beacon, navigation instructions for reaching the destination.

6. The method of claim 5, further comprising:
receiving, by the one or more processors from the first antenna, a third signal from the beacon;
receiving, by the one or more processors from the second antenna, a fourth signal from the beacon;
determining, by the one or more processors based on the third signal and the fourth signal, at least one new signal strength;
determining, by the one or more processors based on the at least one new signal strength, a new distance between the user to the beacon; and
generating, by the one or more processors based on the new distance between the user to the beacon, updated navigation instructions for reaching the destination.

7. The method of claim 1, further comprising:
receiving, by the one or more processors from the first antenna, a third signal from the beacon;
receiving, by the one or more processors from the second antenna, a fourth signal from the beacon;
comparing, by the one or more processors, the third signal and the fourth signal;
determining, by the one or more processors based on the comparison, a new distance between the user to the beacon or a new position of the user relative to the beacon; and
generating, by the one or more processors based on the new distance between the user to the beacon or the new position of the user relative to the beacon, updated navigation instructions for reaching the destination.

8. The method of claim 1, further comprising:
receiving, by the one or more processors, a request for additional information about items in an indoor environment;
accessing, by the one or more processors, a storage system to obtain locations of a plurality of items relative to the beacon in the indoor environment;
determining, by the one or more processors based on the position of the user relative to the beacon and the locations of the plurality of items relative to the beacon, a position of the user relative to an item of the plurality of items;
determining, by the one or more processors based on the position of the user relative to the item, that the user is viewing the item;
accessing, by the one or more processors, the storage system to obtain additional information about the item; and
generating, by the one or more processors, an output including the additional information about the item.

9. The method of claim 8, further comprising:
comparing, by the one or more processors, an arrival time or a signal strength of the received first signal and the received second signal; and
determining, by the one or more processors, based on the comparison of the arrival time or the signal strength of the received first and second signals, a facing direction of the user with respect to the beacon; and
determining, by the one or more processors based on the position of the user relative to the item and the facing direction of the user with respect to the beacon, a facing direction of the user with respect to the item, wherein determining that the user is viewing the item is further based on the facing direction of the user with respect to the item.

10. The method of claim 8, further comprising:
receiving, by the one or more processors, motion data from one or more sensors indicating a movement of the user, wherein determining that the user is viewing the item is further based on the motion data.

11. The method of claim 1, further comprising:
receiving, by the one or more processors, a request for enhanced interactive experience;
accessing, by the one or more processors, a storage system to obtain a location of a display relative to the beacon;
determining, by the one or more processors based on the position of the user relative to the beacon and the location of the display relative to the beacon, a position of the user relative to the display;
controlling, by the one or more processors based on the position of the user relative to the display, one or more characteristics of an audio output.

12. The method of claim 11, further comprising:
comparing, by the one or more processors, an arrival time or a signal strength of the received first signal and the received second signal; and
determining, by the one or more processors, based on the comparison of the arrival time or the signal strength of the received first and second signals, a facing direction of the user with respect to the beacon; and
determining, by the one or more processors based on the position of the user relative to the display and the facing direction of the user with respect to the beacon, a facing direction of the user with respect to the display, wherein controlling the one or more characteristics of the audio output is further based on the facing direction of the user with respect to the display.

13. The method of claim 11, wherein controlling the one or more characteristics of the audio output is further based on the motion data.

14. The method of claim 1, wherein the determining, by the one or more processors based on the received first signal and the received second signal, a signal strength of the beacon is based on a received signal strength indicator (RSSI) of the received first signal and an RSSI of the received second signal.

15. The method of claim 1, wherein the determining, by the one or more processors based on the received first signal and the received second signal, a signal strength of the beacon is based on a first time-of-flight (ToF) measurement or a first angle-of-arrival (AoA) measurement from the received first signal and a second ToF measurement or a second AoA measurement from the received second signal.

16. A system, comprising:
one or more processors configured to:
receive, from a first antenna located in a first housing of a first earbud worn by a user, a first signal from a beacon;
receive, from a second antenna located in a second housing of a second earbud worn by the user, the second housing being different than the first housing, a second signal from the beacon;
determine, based on the received first signal and the second signal, a signal strength of the beacon;
determine, based on the signal strength of the beacon, at least one of a distance between the user to the beacon or a position of the user relative to the beacon;
receive motion data from one or more sensors indicating a movement of the user; and
correlate the motion data with the first signal and the second signal, wherein determining the distance between the user to the beacon or the position of the user relative to the beacon is further based on the correlated motion data.

17. The system of claim 16, further comprising:
one or more output devices configured to generate outputs with one or more characteristics based on the position of the user relative to the beacon.

18. A pair of earbuds, comprising:
a first earbud including a first antenna in a first housing;
a second earbud including a second antenna in a second housing, the second housing being different than the first housing; and
one or more processors configured to:
receive, from the first antenna, a first signal from a beacon;
receive, from the second antenna, a second signal from the beacon;
determine, based on the received first signal and the second signal, a signal strength of the beacon;
determine, based on the signal strength of the beacon, at least one of a distance between the user to the beacon or a position of the user relative to the beacon;
receive motion data from one or more sensors indicating a movement of the user; and
correlate the motion data with the first signal and the second signal, wherein determining the distance between the user to the beacon or the position of the user relative to the beacon is further based on the correlated motion data.

* * * * *